US008948731B2

(12) United States Patent
Qu et al.

(10) Patent No.: US 8,948,731 B2
(45) Date of Patent: Feb. 3, 2015

(54) RATING OF MESSAGE CONTENT FOR CONTENT CONTROL IN WIRELESS DEVICES

(75) Inventors: Hai Qu, San Diego, CA (US); Clifton Eugene Scott, San Diego, CA (US); Homayoun Dowlat, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1330 days.

(21) Appl. No.: 12/176,096

(22) Filed: Jul. 18, 2008

(65) Prior Publication Data

US 2010/0015956 A1     Jan. 21, 2010

(51) Int. Cl.
| | |
|---|---|
| *H04M 3/42* | (2006.01) |
| *H04W 4/00* | (2009.01) |
| *H04N 21/475* | (2011.01) |
| *H04N 21/414* | (2011.01) |
| *H04N 21/258* | (2011.01) |
| *H04N 7/16* | (2011.01) |

(52) U.S. Cl.
CPC .......... *H04N 7/163* (2013.01); *H04N 21/4755* (2013.01); *H04N 21/41407* (2013.01); *H04N 21/25891* (2013.01); *H04N 21/25816* (2013.01)
USPC ...................... 455/414; 455/422.1

(58) Field of Classification Search
USPC ...................... 455/410, 411, 414.1
See application file for complete search history.

(56) References Cited

U.S. PATENT DOCUMENTS

| | | | |
|---|---|---|---|
| 7,043,555 B1 | 5/2006 | McClain et al. | |
| 2002/0091734 A1 | 7/2002 | Redlich et al. | |
| 2003/0028622 A1 | 2/2003 | Inoue et al. | |
| 2003/0120935 A1 | 6/2003 | Teal et al. | |
| 2004/0153358 A1 | 8/2004 | Lienhart | |
| 2005/0215240 A1* | 9/2005 | Urakawa et al. ........... 455/414.1 |

(Continued)

FOREIGN PATENT DOCUMENTS

| | | |
|---|---|---|
| CN | 101111053 A | 1/2008 |
| EP | 1746599 A1 | 1/2007 |

(Continued)

OTHER PUBLICATIONS

Categorization Based Content Screening 1.0,OMA-TS-CBCS-V1_0-20080417-D,Open Mobile Alliance,Apr. 17, 2008, URL,http://member.openmobilealliance.org/ftp/Public_documents/ARCH/Permanent_documents/OMA-TS-CBCS-V1_0-20080417-D.zip.

(Continued)

*Primary Examiner* — Michael Faragalla
(74) *Attorney, Agent, or Firm* — Fariba Yadegar-Bandari

(57) ABSTRACT

Systems, methodologies, and devices are described that facilitate filtering content sent to a mobile device(s) by a content provider via a core network. A content provider can determine a content rating for content, and/or the core network and/or mobile device can determine or infer a content rating for unrated content from a content provider, based in part on predefined content rating criteria. A mobile device user can specify a desired content rating preference for the mobile device. A filter(s) respectively associated with the core network and/or mobile device can filter the content based in part on the content rating of the content and the content rating preference of the mobile device to which the content is being sent. Content that does not meet a content rating threshold can be filtered out and stored in a secure content folder accessible using a security code or discarded.

48 Claims, 15 Drawing Sheets

(56) References Cited

U.S. PATENT DOCUMENTS

| | | | |
|---|---|---|---|
| 2006/0013191 A1* | 1/2006 | Kavanagh | 370/349 |
| 2007/0029379 A1 | 2/2007 | Peyer | |
| 2007/0224969 A1* | 9/2007 | Rao | 455/411 |
| 2007/0256092 A1 | 11/2007 | Chung et al. | |
| 2007/0260603 A1 | 11/2007 | Tuscano et al. | |
| 2008/0059409 A1 | 3/2008 | Montpetit | |
| 2008/0120288 A1 | 5/2008 | Guan et al. | |
| 2008/0168486 A1 | 7/2008 | Song et al. | |
| 2008/0168490 A1 | 7/2008 | Yu | |

FOREIGN PATENT DOCUMENTS

| | | |
|---|---|---|
| EP | 1936892 A1 | 6/2008 |
| JP | 2005277577 A | 10/2005 |
| JP | 2011510410 A | 3/2011 |
| RU | 2265961 C2 | 12/2005 |
| RU | 2006118108 A | 12/2007 |
| WO | WO-0106398 A2 | 1/2001 |
| WO | WO-0250787 A1 | 6/2002 |
| WO | WO-2005050416 A1 | 6/2005 |
| WO | WO-2008025008 A2 | 2/2008 |

OTHER PUBLICATIONS

Categorization Based Content Screening Framework Architecture,OMA-AD-CBCS-V1_0-20080226-D,Open Mobile Alliance,Feb. 26, 2008, URL,http://member.openmobilealliance.org/ftp/Public_documents/ARCH/Permanent_documents/OMA-AD-CBCS-V1_0-20080226-D.zip.

International Search Report and Written Opinion—PCT/US2008/088252, International Search Authority—European Patent Office—Jun. 19, 2009.

Taiwan Search Report—TW097151737—TIPO—Jun. 18, 2012.

European Search Report—EP13182854—Search Authority—The Hague—Oct. 10, 2013.

* cited by examiner

US 8,948,731 B2

RATING OF MESSAGE CONTENT FOR CONTENT CONTROL IN WIRELESS DEVICES

BACKGROUND

I. Field

The following description relates generally to wireless communications, and more particularly to rating message content for content control in wireless devices.

II. Background

Wireless communication systems are widely deployed to provide various types of communication; for instance, voice and/or data can be provided via such wireless communication systems. A typical wireless communication system, or network, can provide multiple users access to one or more shared resources (e.g. bandwidth, transmit power, etc.) For instance, a system can use a variety of multiple access techniques such as Frequency Division Multiplexing (FDM), Time Division Multiplexing (TDM), Code Division Multiplexing (CDM), Third Generation Partnership Project (3GPP) Long-Term Evolution (LTE) systems, Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. This communication link can be established via a single-in-single-out, multiple-in-signal-out, or a multiple-in-multiple-out (MIMO) system.

For instance, a MIMO system can employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which are also referred to as spatial channels, where $N_S \leq \min\{N_T, N_R\}$. Each of the $N_S$ independent channels can correspond to a dimension. The MIMO system can provide improved performance (e.g., higher throughput and/or greater reliability) if the additional dimensionalities created by the multiple transmit and receive antennas are utilized.

A MIMO system can support a time division duplex (TDD) and frequency division duplex (FDD) systems. In a TDD system, the forward and reverse link transmissions can be on the same frequency region so that the reciprocity principle allows the estimation of the forward link channel from the reverse link channel. This can enable the access point to extract transmit beamforming gain on the forward link when multiple antennas are available at the access point Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Mobile devices can be utilized for voice and data communication. For example, a mobile device can transmit content, such as text messages, audio content, visual images, video content, multimedia content, and the like, to other mobile devices or communication devices. Types of messaging can include, for example, short message service (SMS), enhanced messaging service (EMS), and multimedia messaging service (MMS). Content providers that provide content transmitted to a mobile device can be mobile device users, commercial entities, etc.

Conventionally, content can be transmitted by content providers to mobile devices regardless of the nature of the content. Thus, for example, it is possible for adult-oriented content to be transmitted to a mobile device that is being used by a child. It is desirable to be able to control content being provided to communication devices (e.g., mobile devices) so that undesirable content (e.g., adult-oriented content) is not received by communication devices utilized by certain users for whom it is desired that such users not receive and/or perceive undesirable content.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating filtering content sent to a mobile device(s) by a content provider via a core network. A content provider can determine a content rating for content, and/or the core network and/or mobile device can determine or infer a content rating for unrated content from a content provider, based at least in part on predefined content rating criteria. The predefined rating criteria can relate to the adult-oriented nature of content. For instance, content that is highly adult-oriented (e.g., highly sexual or violent text, audio content, visual images, and/or multimedia content) can be assigned a higher content rating than content that is deemed to be less adult-oriented in nature. A mobile device user (e.g. parent of a child who will have access to the mobile device) can specify a desired content rating preference for the mobile device. A filter(s) respectively associated with the core network and/or mobile device can filter the content from a content provider based at least in part on the content rating of the content and the content rating preference of the mobile device to which the content is being sent. Content that does not meet a content rating threshold (e.g., content with a content rating that is higher than the content rating preference associated with the mobile device) can be filtered out, where the filtered out content can be stored in a secure content folder, which can be accessed using an applicable security code, or discarded, as desired.

According to related aspects, a method that facilitates communication associated with a mobile device is described herein. The method can include setting a control rating preference associated with the mobile device. Further, the method can comprise receiving at least one message comprising at least one piece of content from at least one content provider, the at least one message comprising at least one content rating associated with the at least one piece of content, the at least one piece of content is filtered based at least in part on the control rating preference and the at least one content rating.

Another aspect relates to a wireless communications apparatus. The wireless communications apparatus can include a memory that retains instructions related to establishment of a control rating preference associated with a mobile device, and reception of at least one message comprising at least one piece of content from at least one content provider, the at least one message comprising at least one content rating associated with the at least one piece of content, the at least one piece of content is filtered based at least in part on the control rating preference and the at least one content rating. Further, the wireless communications apparatus can include a processor, coupled to the memory, configured to execute the instructions retained in the memory.

Yet another aspect relates to a wireless communications apparatus that facilitates communication associated with a mobile device. The wireless communications apparatus can include means for setting a control rating preference associated with the mobile device. Further, the wireless communications apparatus can comprise means for receiving at least one message comprising at least one piece of content from at least one content provider, the at least one message comprising at least one content rating associated with the at least one piece of content, the at least one piece of content is filtered based at least in part on the control rating preference and the at least one content rating.

Still another aspect relates to a computer program product, comprising: a computer-readable medium comprising code for: setting a control rating preference associated with a mobile device; and receiving at least one message comprising at least one piece of content from at least one content provider, the at least one message comprising at least one content rating associated with the at least one piece of content, the at least one piece of content is filtered based at least in part on the control rating preference and the at least one content rating.

In accordance with another aspect, an apparatus in a wireless communication system can include a processor, wherein the processor can be configured to establish a control rating preference associated with a mobile device. Moreover, the processor can be configured to receive at least one message comprising at least one piece of content from at least one content provider, the at least one message comprising at least one content rating associated with the at least one piece of content, the at least one piece of content is filtered based at least in part on the control rating preference and the at least one content rating.

According to other aspects, a method that facilitates communication associated with a mobile device is described herein. The method can include evaluating at least one piece of content received in at least one message being sent to at least one mobile device from at least one content provider, the at least one message comprising at least one content rating associated with the at least one piece of content. Further, the method can comprise filtering the at least one piece content based at least in part on the at least one content rating and at least one content rating preference associated with the at least one mobile device.

Yet another aspect relates to a wireless communications apparatus that can include a memory that retains instructions related to evaluation of at least one piece of content received in at least one message being sent to at least one mobile device from at least one content provider, the at least one message comprising at least one content rating associated with the at least one piece of content, the at least one content rating based at least in part on predefined content rating criteria; and filter of the at least one piece content based at least in part on the at least one content rating and at least one content rating preference associated with the at least one mobile device. Further, the wireless communications apparatus can comprise a processor, coupled to the memory, configured to execute the instructions retained in the memory.

Another aspect relates to a wireless communications apparatus that facilitates communication associated with a mobile device. The wireless communications apparatus can include means for evaluating at least one piece of content received in at least one message being sent to at least one mobile device from at least one content provider, the at least one message comprising at least one content rating associated with the at least one piece of content, the at least one content rating based at least in part on predefined content rating criteria. Further, the wireless communications apparatus can include means for filtering the at least one piece content based at least in part on the at least one content rating and at least one content rating preference associated with the at least one mobile device.

Still another aspect relates to a computer program product, comprising: a computer-readable medium comprising code for: evaluating at least one piece of content received in at least one message being sent to at least one mobile device from at least one content provider, the at least one message comprising at least one content rating associated with the at least one piece of content, the at least one content rating based at least in part on predefined content rating criteria; and filtering the at least one piece content based at least in part on the at least one content rating and at least one content rating preference associated with the at least one mobile device.

In accordance with another aspect, an apparatus in a wireless communication system can include a processor, wherein the processor can be configured to evaluate at least one piece of content received in at least one message being sent to at least one mobile device from at least one content provider, the at least one message comprising at least one content rating associated with the at least one piece of content, the at least one content rating based at least in part on predefined content rating criteria. Further, the processor can be configured to filter the at least one piece content based at least in part on the at least one content rating and at least one content rating preference associated with the at least one mobile device.

According to other aspects, a method that facilitates communication associated with a mobile device is described herein. The method can include determining a content rating for content based at least in part on predefined content rating criteria. Further, the method can comprise inserting the content and the content rating into a message that is sent to at least one mobile device to facilitate filtering content sent to the at least one mobile device by a content provider that provides the content.

Yet another aspect relates to a wireless communications apparatus that can include a memory that retains instructions related to generation of a content rating for content based at least in part on predefined content rating criteria; and insertion of the content and the content rating into a message that is sent to at least one mobile device to facilitate filtering content sent to the at least one mobile device by a content provider that provides the content. Further, the wireless communications apparatus can comprise a processor, coupled to the memory, configured to execute the instructions retained in the memory.

Another aspect relates to a wireless communications apparatus that facilitates communication associated with a mobile device. The wireless communications apparatus can include means for determining a content rating for content based at least in part on predefined content rating criteria. Further, the wireless communications apparatus can include means for inserting the content and the content rating into a message that is sent to at least one mobile device to facilitate filtering content sent to the at least one mobile device by a content provider that provides the content.

Still another aspect relates to a computer program product, comprising: a computer-readable medium comprising code for: generating a content rating for content based at least in part on predefined content rating criteria; and inserting the content and the content rating into a message that is sent to at least one mobile device to facilitate filtering content sent to the at least one mobile device by a content provider that provides the content.

In accordance with another aspect, an apparatus in a wireless communication system can include a processor, wherein the processor can be configured to determine a content rating for content based at least in part on predefined content rating criteria. Further, the processor can be configured to insert the content and the content rating into a message that is sent to at least one mobile device to facilitate filtering content sent to the at least one mobile device by a content provider that provides the content.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
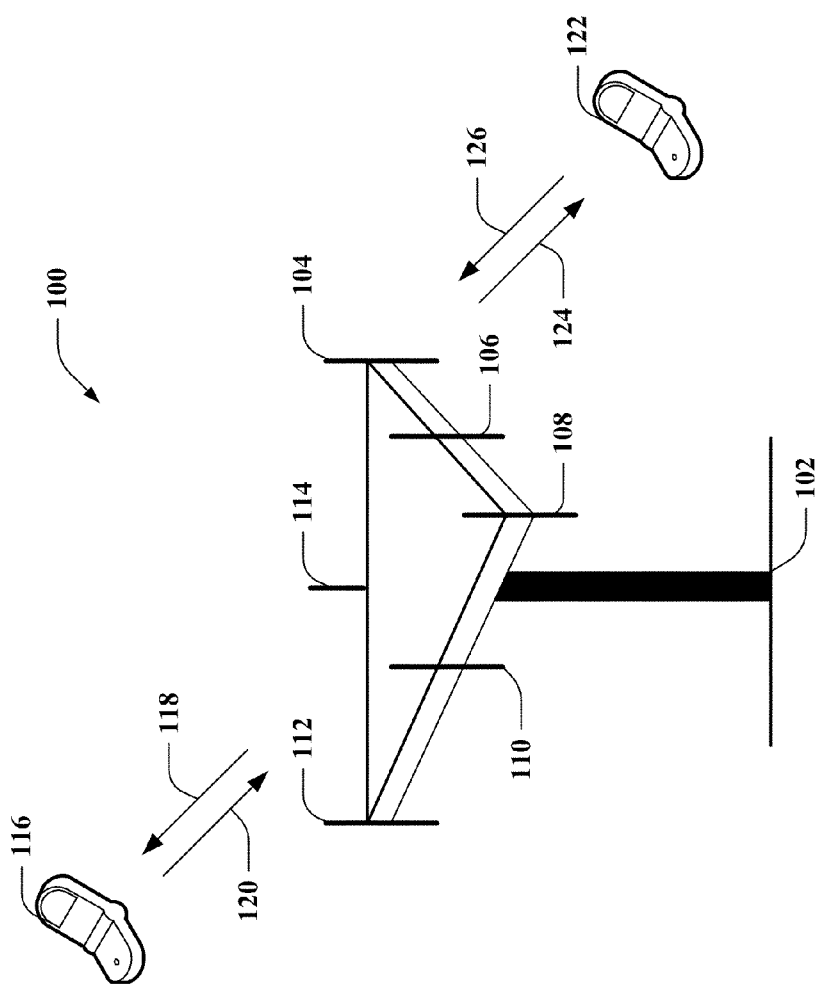
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," "communicator," "controller," "account menu," control rating preference menu," "command generator," "access controller," "content filter," "rating generator," "account coordinator," "processor," "communicator," and the like can refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMO, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). These various radio technologies and standards are known in the art.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B (e.g., evolved Node B, eNode B, eNB), or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

FIG. 1 illustrates a wireless communication system 100 in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. It is to be appreciated that, while one base station 102 is depicted in FIG. 1, the disclosed subject matter can comprise more than one base station in the network, such as, for example, a serving base station 102 and one or more neighbor base stations 102.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 (e.g., downlink (DL)) and receive information from mobile device 116 over a reverse link 120 (e.g., uplink (UL)). Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices (e.g., 116) in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Typically, mobile devices can be utilized for voice and data communication. For example, a mobile device can transmit messages that contain content, such as text messages, audio content (e.g., songs, ring tones, audio jokes, . . . ), animations, visual images, video content, multimedia content, and the like, to other mobile devices or communication devices via the core network. Types of messaging can include, for example, short message service (SMS), enhanced messaging service (EMS), and multimedia messaging service (MMS). The content can be provided by content providers (e.g., value added service providers) that can transmit content to a desired mobile device(s) via the core network, where content providers can include mobile device users, commercial entities, etc., that transmit messages containing content.

Conventionally, content can be transmitted by content providers to mobile devices regardless of the nature of the content. Thus, for example, it is possible for adult-oriented content (e.g., adult-oriented jokes, adult-oriented pictures, adult-oriented videos, violent images and/or words, etc.) to be transmitted to a mobile device that is being used by a child or other sensitive person. It is desirable to be able to control content being provided to communication devices (e.g., mobile devices) so that undesirable content (e.g., adult-oriented content) is not received by communication devices of certain users for whom it is desired that such users not receive and/or perceive undesirable content. For example, a parent, who has a mobile device (e.g., 116), can desire to control content that is received by the mobile device so that certain content (e.g., adult-oriented content) is not received by the mobile device and viewed by a child of that parent (e.g., parent provides the child with the child's own mobile device, or parent allows child to use the parent's mobile device when the child is away from the parent).

In accordance with various aspects, the subject innovation can enable a mobile device user (e.g., subscriber) to use a rating system to specify what content can be received by the mobile device (e.g., 116) of the user. The user can securely set a content rating preference for the mobile device 116 to a desired content rating via the mobile device 116, a voice call to a representative of the core network, and/or a web site associated with the core network. The subject innovation can rate content based at least in part on a content rating that can be determined and provided by the content provider or can be automatically determined (or inferred) (e.g., by the core network, the mobile device 116) based at least in part on analyzing the content, where the rating of content can be determined based at least in part on predefined content rating criteria. The subject innovation can facilitate filtering content based at least in part on a predefined content rating preference that can be specified by a user (e.g., subscriber) of the mobile device 116, so that content (e.g., adult-oriented content), which does not meet the content rating preference for the mobile device 116, is not received by the mobile device 116 and/or not perceived using the mobile device 116 (e.g., filtered content can be stored in a secure content folder, but cannot be perceived until a security code is provided).

Figure 2:
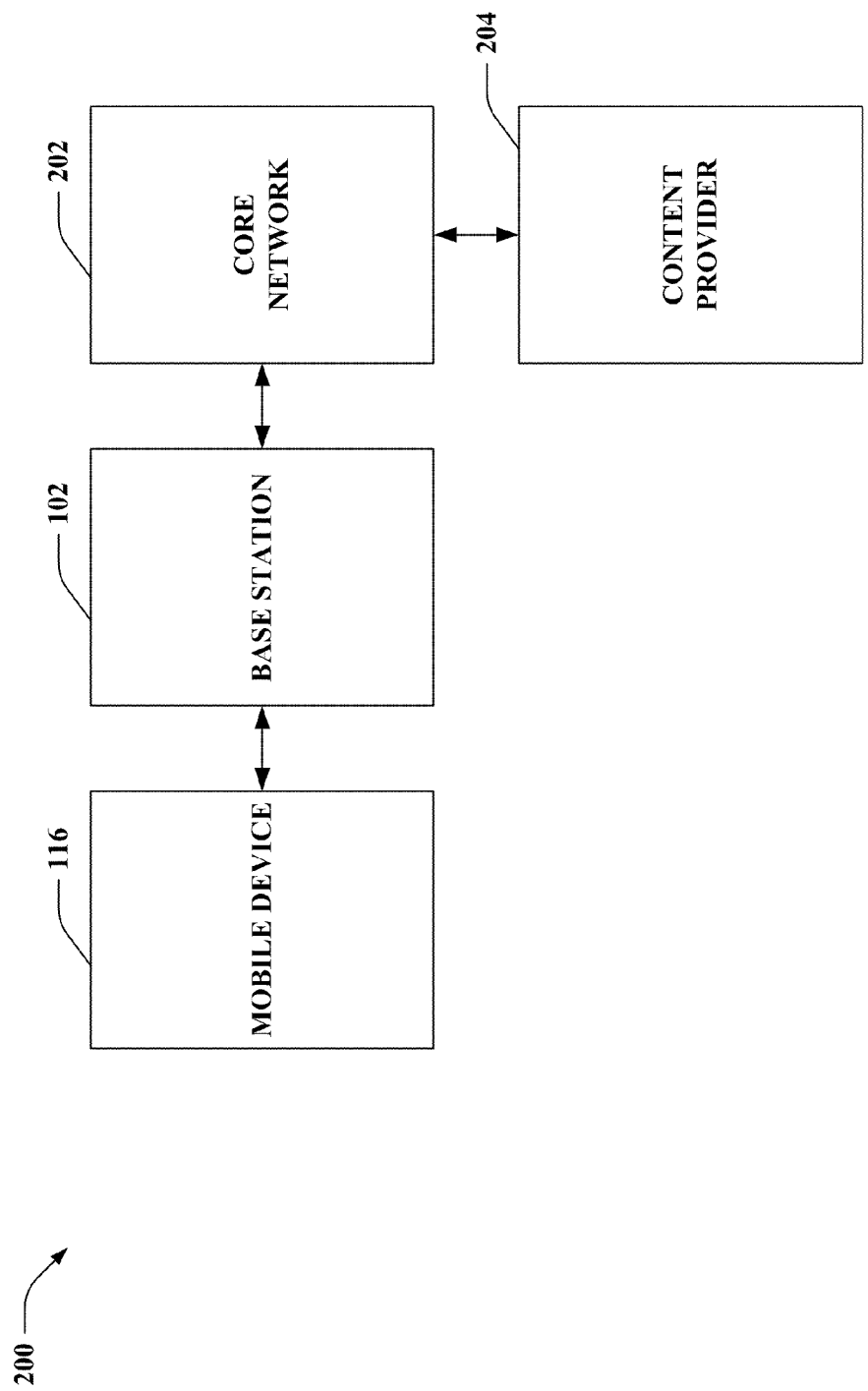
FIG. 2 is an illustration of an example wireless communication system that can facilitate controlling content provided to a mobile device in accordance with various embodiments presented herein.

Referring to FIG. 2 illustrates a wireless communication system 200 that can facilitate controlling content provided to a mobile device in accordance with various embodiments presented herein. System 200 can comprise a mobile device 116 that can communicate (e.g., voice, data) in a wireless network environment. System 200 also can include a base station 102 that can be a base station serving and in connection (e.g., wireless connection) with a mobile device 116 in the wireless communication environment. It is to be appreciated and understood that the mobile device 116 and base station 102 each can be the same or similar as, and/or can comprise the same or similar functionality as, respective components, such as more fully described herein, for example, with regard to system 100. It is to be further appreciated and understood that, while only one mobile device 116 and one base station 102 are depicted in system 200, the subject innovation is not so limited, as system 200 can include virtually any desired number of mobile devices and base stations.

In accordance with an embodiment, the mobile device (e.g. 116) can be communicatively connected (e.g., wirelessly connected) to a base station 102 in a core network 202, such that the mobile device 116 can be communicatively connected to the core network 202 and other mobile devices (e.g., 122) and/or communication devices associated with the core network 202. The core network 202 can be associated with one or more content providers 204 that can provide content to mobile devices (e.g., 116) associated with the core network 202. A content provider 204 can utilize a mobile device (e.g., 122), a computer, and/or other communication device to facilitate providing content associated with the content provider 204. It is to be further appreciated and understood that, while three content providers are depicted in system 200, the subject innovation is not so limited, as system 200 can include virtually any desired number of content providers, which can be less than three, three, or more than three content providers.

A content provider(s) 204 can desire to send content to a mobile device 116. In accordance with an aspect, the mobile device 116 can be associated with a content rating preference that can be utilized to filter certain content (e.g., adult-oriented content) as desired by the user (e.g., subscriber) of the mobile device 116 based at least in part on predefined content rating criteria. In one aspect, a desired content rating(s) preference, related to filtering of undesired content so that undesired content is not received by the mobile device 116, can be transmitted by the mobile device 116 to the core network 202. The desired content rating preference can be specified by a user of the mobile device 116.

In accordance with an embodiment, system 200 can employ one or more additional commands (e.g., SMS commands) that can be added to the messaging protocol (e.g., SMS protocol) to enable a user (e.g., subscriber) to use the user's mobile device 116 to send a message(s) (e.g., SMS message) to the core network 202 to dynamically configure a content rating preference(s) associated with the mobile device 116 and the user's account to facilitate filtering out certain content (e.g., adult-oriented content) that a content provider(s) attempts to provide to the mobile device 116 via the core network 202. In one aspect, the user can provide a desired content rating preference to the core network 202 via a voice call to a representative (e.g., operator) associated with the core network 202, a web site associated with the core network 202 (e.g., subscriber can use a wireless communication device or a computer-type device to access web site associated with the core network 202), and/or another form of communication using another type of communication device that is associated with and/or can communicate with the core network 202.

In accordance with various aspects, to facilitate employing the content rating system, with regard to messages (e.g., SMS messages, EMS messages, MMS messages) sent by content providers, a protocol field(s) can be added to a message that can contain a content rating to indicate the content rating associated with the content that the content provider 204 is attempting to send to mobile device 116. The additional protocol field(s) can exist in mobile terminated (MT), mobile originated (MO), and/or Broadcast SMS messages, with or without EMS content. For example, for CDMA SMS, a subparameter (e.g., Teleservice Layer Subparameter) for the content rating preference can be added as (1) Subparameter: Rating; (2) ID: the next usable Subparameter ID number; (3) Length: 1; and (4) Value: 0-255, where the desired content rating system can be implemented or mapped using the Value. As another example, for CDMA and GSM/UMTS SMS, an EMS header can be added as (1) Header: Rating; (2) ID: the next usable EMS Header ID number; (3) Length: 1; and (4) Value: 0-255, where the desired content rating system can be implemented or mapped using the Value. For example, in accordance with an aspect of the disclosed subject matter, a new SMS message type can be added to enable the mobile device 116 to transmit an SMS message that contains the desired content rating reference value to the core network 202, where the content rating subparameter (e.g., Teleservice Layer Subparameter, EMS header) can be included in the new SMS message type to facilitate instructing the core network 202 to filter content being sent to the mobile device 116 in accordance with the content rating preference value specified in the SMS message. Alternatively, a content rating for content can be included in the body of the message. For example, a keyword(s) in the body of the message can indicate that a content rating is included in the message (e.g., content rating can be a value that follows a keyword in the message).

In accordance with yet another aspect, the content rating for content can be set based at least in part on a number(s), word(s), icon(s), etc. For example, the content rating can be a number ranging from 0 to N, where N can be virtually any desired integer number (e.g., 255). Content having a content rating that is above the content rating value can be filtered out, and content that is below the content rating value can be received by the mobile device 116 and viewed by a user(s) of the mobile device 116.

In accordance with one embodiment, the core network 202 can automatically filter content based at least in part on the content rating preference specified by the user. The core network 202 can set the content rating preference parameter in the content rating preference menu for the user's account (e.g., associated with the mobile device 116) to the content rating preference value specified by the user. In one aspect, the content rating preference associated with a mobile device(s) 116 can be set based at least in part on a number(s), word(s), icon(s), etc. For example, the content rating preference can be a number ranging from 0 to N, where N can be virtually any desired integer number (e.g., 255), and where the range of content rating preference values (e.g., 0 to N) can be the same as the range of content ratings (e.g., 0 to N). Content that has a content rating that is above the content rating value can be filtered out, and content that is below the content rating value can be received by the mobile device 116 and viewed by a user(s) of the mobile device 116. Thus, for example, given a content rating preference set at 255, no content will be filtered out, since the highest content rating of 255 will not be greater than the content rating preference. As another example, given a content rating preference of 200 for a mobile device 116, and a content rating of 230 for content from a content provider 204, the content can be filtered out, because the content rating is higher than the content rating preference.

In one aspect, when a content provider 204 attempts to send content to the mobile device 116 of the user, the core network 202 can analyze the content and can retrieve and/or determine a content rating associated with the content. The core network 202 can evaluate the content rating associated with the content based at least in part on the specified content rating preference (e.g., content rating value of the content can be compared to the content rating preference value set by the user), and if the content rating of the content does not meet the predefined content rating threshold (e.g., content has a content rating value that is higher than the specified content rating preference value), the core network 202 can automatically filter out the content.

In one aspect, as desired, the filtered out content can be discarded (e.g., deleted) and not provided to the mobile device 116, or can be placed in a secure content folder that can be stored in the core network 202 that can only be accessed by a particular entity (e.g., subscriber, such as a parent) authorized to access the secure content folder and not provided to the mobile device 116. If the core network 202 determines (e.g., automatically determines) that the content meets the content rating (e.g., content rating value of the content is at or below the specified content rating preference value), the core network 202 can send the content to the mobile device 116. Access to the secure content folder can be controlled, for example, by using a security code (e.g., personal identification number (PIN), password, pass phrase, biometric identification, etc.) that can be associated with the secure content folder. To access the secure content folder, the proper security code for the secure content folder has to be presented to the core network 202. In another aspect, as desired, a notification (e.g., text message, voice mail, e-mail, . . . ) can be sent to the mobile device 116 or communication device (e.g., computer) of the user, where the notification can indicate that content has been filtered out to facilitate informing the user that content has been filtered out.

In accordance with another embodiment, the mobile device 116 itself can automatically filter content that is sent to the mobile device 116 by a content provider(s) based at least in part on a content rating preference, as specified by the user of the mobile device 116, where the content rating preference can be entered into and stored in the rating preferences of the mobile device 116. In one aspect, the mobile device 116 can analyze the content and can retrieve and/or determine the content rating associated with the content. The mobile device 116 can evaluate the content rating of the content sent to the mobile device 116 and can compare that content rating to the specified content rating preference as set in the rating preferences for the mobile device 116. If the mobile device 116 determines (e.g., automatically determines) that the content rating of the content does not meet the predefined content rating threshold (e.g., content has a content rating value that is higher than the specified content rating preference value), the mobile device 116 can filter out the content. In an aspect, the filtered out content can be discarded or optionally can be received by the mobile device 116 and placed in a secure content folder, which can be in the mobile device 116, where the secure content folder can be accessed by an entity (e.g. subscriber, such as a parent) authorized to access the secure content folder. Thus, for example, if a child of a mobile device user is possessing or using the mobile device 116, the child will be unable to access the filtered out content in the secure content folder (unless the child has the security code for accessing the secure content folder). If the mobile device 116 determines that the content meets the content rating (e.g., content rating value of the content is at or below the specified content rating preference value), the mobile device 116 can receive the content and the content can be accessed by a current user (e.g., user, user's child, . . . ). Access to the secure content folder can be controlled, for example, by using a security code (e.g., personal identification number (PIN), password, pass phrase, biometric identification, etc.) that can be associated with the secure content folder. To access the secure content folder, the proper security code for the secure content folder has to be presented to the mobile device 116.

In accordance with yet another embodiment, the core network 202 and/or mobile device 116 can determine or infer a content rating for content (e.g., content that does not contain a content rating) that a content provider 204 is attempting to send to the mobile device 116. In one aspect, the core network 202 and/or mobile device 116 can infer a content rating for content by analyzing and classifying the content. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data (e.g., historical data), whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action (e.g., generating a content rating, filtering out content, . . . ) in connection with the disclosed subject matter.

In accordance with still another embodiment, the core network 202 and/or mobile device 116 can determine whether the mobile device 116 is to receive a message comprising unrated content based at least in part on one or more contact lists associated with the mobile device 116. In one aspect, the core network 202 can receive a message comprising unrated content from a content provider 204. The core network 202 can retrieve and review (e.g., analyze) one or more contact lists, such as a list of contacts (e.g., content provider 204) that the mobile device 116 has contacted and/or a list of contacts that have contacted the mobile device 116, containing contacts during a predetermined period of time prior to the current communication of unrated content. The core network 202 can determine that the current message and unrated content can be sent to the mobile device 116 if the content provider 204 providing the unrated content is on a specified contact list(s) (e.g., contact list(s) selected by the user of the mobile device 116 and/or the core network 202) associated with the mobile device 116, and, if the content provider 204 is not on the specified contact list(s), the core network 202 can filter out the unrated content and store the filtered out content in a secure content folder associated with the mobile device 116 or discard the filtered out content, as desired. The policy for filtering unrated content by the core network 202 can be specified by the core network 202 or the user of the mobile device 116, as desired.

In another aspect, the mobile device 116 can receive a message comprising unrated content from a content provider 204 via the core network 202. The mobile device 116 can retrieve and review (e.g., analyze) one or more contact lists, such as a list of contacts (e.g., content provider 204) that the mobile device 116 has contacted (e.g., local stored outgoing message or call list), a list of contacts (e.g., local stored incoming message or call list) that have contacted the mobile device 116, a list of stored contacts (e.g., local stored contact list) associated with the mobile device 116, containing contacts during a predetermined period of time prior to the current communication of unrated content. The mobile device 116 can determine that the current message and unrated content can be perceived (e.g., displayed) by the mobile device 116 if the content provider 204 providing the unrated content is on a specified contact list(s) (e.g., contact list(s) selected by the user of the mobile device 116) associated with the mobile device 116, and, if the content provider 204 is not on the specified contact list(s), the mobile device 116 can filter out the unrated content and store the filtered out content in a secure content folder associated with the mobile device 116 or discard the filtered out content, as desired. The policy for filtering unrated content can be specified by the user of the mobile device 116, as desired.

In accordance with an aspect of the disclosed subject matter, a user of a mobile device 116 can block individual content providers 204, as desired by the user. The mobile device user can block a content provider 204 that sends content that contains a content rating and/or a content provider 204 that sends unrated content.

In yet another aspect, a message can comprise more than one piece of content. In one aspect, each piece of content contained in a message can contain a respective content rating, which can also be contained in the message. The core network 202 and/or a mobile device 116 can filter out any piece(s) of content in a message that does not meet the content rating threshold (e.g., any piece(s) of content that has a content rating higher than the content rating preference associated with the mobile device 116 to which the message is being sent) and a redacted message comprising any piece(s) of content that meets the content rating threshold (e.g., any piece(s) of content that has a content rating at or below the content rating preference associated with the mobile device 116 to which the message is being sent) can be received by the mobile device 116 and/or perceived by a user of the mobile device 116. In still another aspect, when a message contains more than one piece of content, a content rating can be assigned based at least in part on the content rating for the piece of content having the highest content rating as compared to all content ratings for the pieces of content in the message, and the content can be filtered based at least in part on the highest content rating.

In another aspect, access to the content rating preference menu in order to control (e.g., set, establish, modify) the content rating preference associated with the mobile device 116 can be secured (e.g., controlled) via the mobile device 116, the core network 202 in communication with the mobile device 116, a representative associated with the core network 202 (e.g., representative of core network 202 that speaks with a user via voice call, or an automated representative associated with the core network that interacts with the user via a phone call), and/or a web site associated with the core network, wherein the content rating preference can be secured using a security code (e.g., personal identification number (PIN), password, pass phrase, etc.) associated with the content rating preference parameter. The content rating preference setting can be set or modified by providing the proper security code (associated with the content rating preference menu associated with the mobile device 116) to the core network 202 (e.g., security code provided using a command, such as SMS command sent to the core network using the mobile device 116; security code provided via web site of core network 202; security code provided to a representative of core network 202, . . . ), or, if the mobile device 116 is performing the content filtering, by entering the proper security code into the mobile device 116 (e.g., entering security code at content rating preference menu). As desired, the security code for the content rating preference can be the same as or different than the security code associated with the secure content folder.

In still another aspect, the predefined content rating criteria for rating content can be based at least in part on use of language (e.g., words that a user may find offensive to the user or others, such as a child, due to sexual nature or violent nature of the words), nature of the audio content (e.g., verbal language that a user may find offensive to the user or others, such as a child, due to sexual nature or violent nature of the language), nature of the visual content (e.g., visual depictions that may offend a user or others, such as a child, due to sexual nature, such as nudity or bare clothing, of the visual depiction or violent nature of the visual depiction), type of content (e.g., text, audio, video, etc.), any other criteria related to distinguishing adult-oriented content from non-adult-oriented content, etc. For example, employing the predefined content rating criteria, content (e.g., text, audio, multimedia) that contains vulgar language can have a higher content rating than content that contains benign language; and content that contains obscene language can have a higher content rating than content that contains vulgar language. As another example, employing the predefined content rating criteria, a visual image (e.g., picture, video, multimedia) that depicts a scantily clothed person can be given a higher content rating than a visual image of something considered benign; and a visual image that depicts a person as nude or partially nude (e.g., genitalia showing) can have a higher content rating than content that depicts a scantily clothed person.

In another aspect, the mobile device 116 can send a query to the core network 202 to inquire regarding what the current content rating preference setting. The core network 202 can transmit the current content rating preference setting to the mobile device 116. For example, a new SMS message type can be added to facilitate enabling a mobile device 116 to query the current content rating preference setting from the core network 202.

It is to be appreciated and understood that, as desired, there can be more than one content rating preference for a mobile device 116. For example, there can be a first content rating preference that can have a first value and can apply to textual content; and there can be a second content rating preference that can have a disparate value and can apply to video content. There can be additional content rating preferences, as desired. Also, as desired, there can be first content rating preference associated with the mobile device 116 set and stored in the core network 202, and another content rating preference that can be set and stored locally on the mobile device 116. For example, a mobile device user (e.g., parent) can desire to set and store a local content rating preference on the mobile device 116 that is at a lower value than a remote content rating preference for the mobile device 116 that is set and stored in the core network 202 when the mobile phone user is temporarily giving the mobile device 116 to another user (e.g., child of the mobile device user) and desires that certain content (e.g., adult-oriented content) be filtered out so that the other user is not able to perceive the certain content that potentially can be sent to the mobile device 116 by a content provider 204 while the other user possesses and/or uses the mobile device 116.

The subject innovation can facilitate enabling users of mobile devices 116 to efficiently filter undesired content (e.g., adult-oriented content) so that undesired content is not received by the respective mobile devices (e.g., 116). As a result, the subject innovation can facilitate ensuring that undesired content is not received and/or perceived by certain users of a mobile device 116 (e.g., child of a subscriber associated with the mobile device 116). In accordance with various embodiments, filtering of undesired content by the core network 202 based at least in part on respective content rating preferences of users can facilitate reducing traffic in the network, as the undesired content can be discarded or re-routed in the network before sending it to the particular mobile device. In accordance with other embodiments, setting a local content rating preference for the mobile device can facilitate efficiently filtering undesired content by the mobile device (e.g., 116) based at least in part on a content rating preference for the mobile device, for example, where a mobile device user (e.g., parent) is temporarily giving the mobile device to another user (e.g., child of the mobile device user) and desires that the other user not perceive certain content (e.g. adult-oriented content) that can potentially be sent to the mobile device by a content provider while the other user is possessing and/or using the mobile device. Also, the subject innovation can facilitate enabling content providers 204 to more efficiently operate their businesses and provide content to users, as content can be provided to users, as desired by the users (e.g., different content can be provided to different users based in part on the respective ages of the users). Thus, the subject innovation can employ more efficient and desirable content filtering of content being sent to mobile devices 116 (e.g., wireless communication devices) by content providers 204, as compared to conventional systems or techniques.

Figure 3:
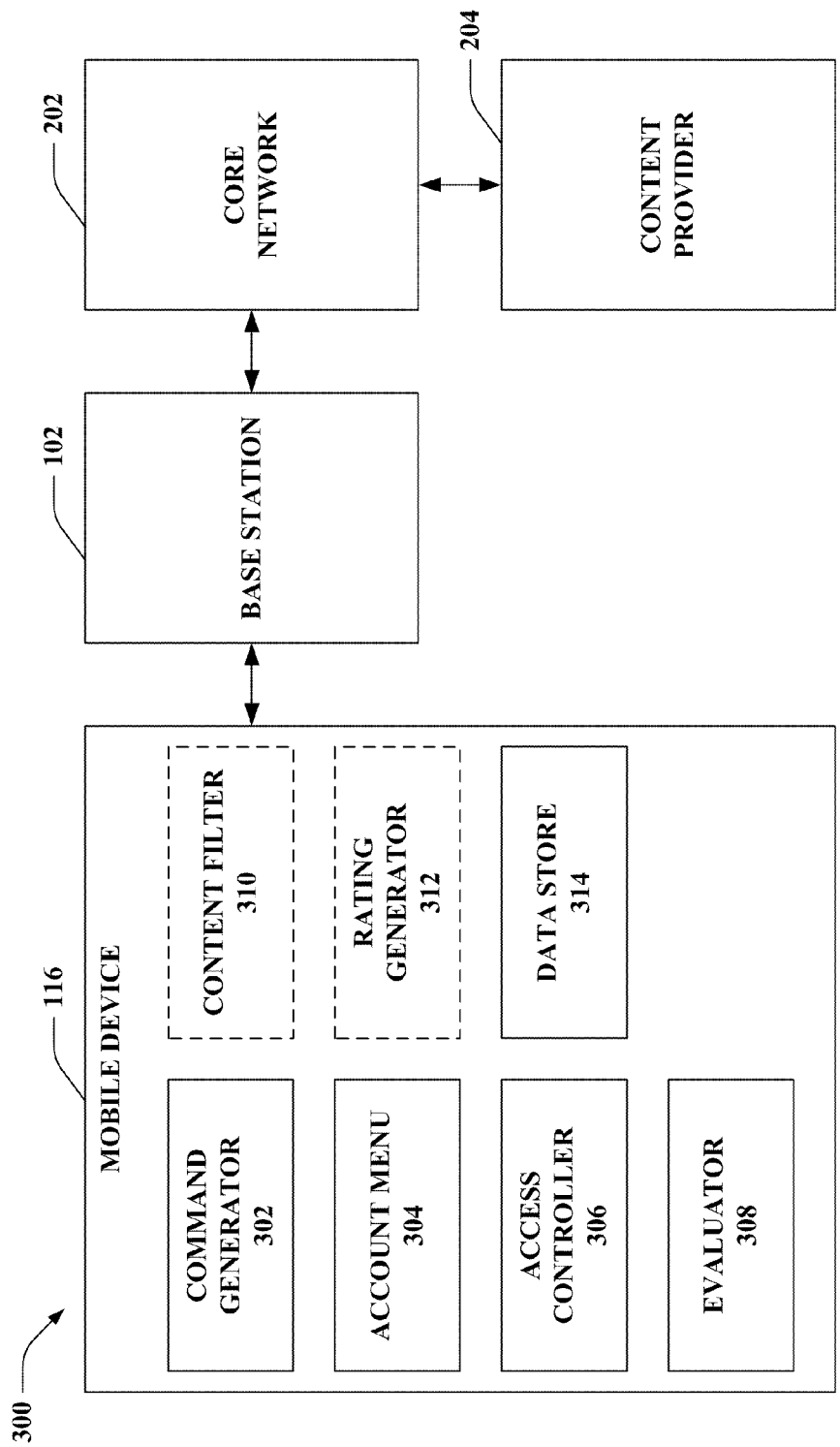
FIG. 3 is a depiction of an example system that can employ a content rating preference to facilitate filtering certain content sent to a mobile device in accordance with an aspect of the disclosed subject matter.

Referring to FIG. 3, depicted is an example system 300 that can employ a content rating preference to facilitate filtering certain content sent to a mobile device in accordance with an aspect of the disclosed subject matter. System 300 can comprise a mobile device 116 that can communicate (e.g., voice, data) in a wireless network environment. System 300 also can include a base station 102 that can be a base station serving and in connection with a mobile device 116 in the wireless communication environment. The mobile device 116 can be connected to a core network 202 via the base station 102. One or more content providers 204 can be associated with the core network 202 to facilitate sending content to mobile devices (e.g., 116) associated with the core network 202. It is to be appreciated and understood that the mobile device 116, base station 102, core network 202, and content provider(s) 204 each can be the same or similar as, and/or can comprise the same or similar functionality as, respective components, such as more fully described herein, for example, with regard to system 100 and/or system 200. It is to be further appreciated and understood that, while only one mobile device 116, one base station 102, and one content provider 204 are depicted in system 300, the subject innovation is not so limited, as system 300 can include virtually any desired number of mobile devices 116, base stations 102, and content providers 204.

In accordance with an aspect, the mobile device 116 can comprise a command generator 302 that can facilitate generating a command(s), such as a command that can include a content rating preference(s), which can be provided to the core network 202 to facilitate setting and/or modifying a content rating preference for the mobile device 116. The command generator 302 also can generate a command to query the core network to request a current content rating preference setting associated with the mobile device 116 from the core network 202. The commands generated by the command generator 302 can be structured in accordance with a specified protocol (e.g., SMS protocol, EMS protocol, MMS protocol, . . . ).

In another aspect, the mobile device 116 also can include an account menu 304 that can be accessed to facilitate setting a desired content rating preference for the mobile device 116. For instance, the account menu 304 can include a content rating preference menu that can be accessed to enter information to facilitate setting the content rating preference. The content rating preference can be stored in the mobile device 116 (e.g., to be utilized by the mobile device 116 when the mobile device 116 performs the filtering of content) and/or can be transmitted to the core network 202 (e.g., to be utilized by the core network 202 when the core network 202 performs the content filtering) to facilitate setting the content rating preference with the core network 202 to facilitate content filtering in accordance with the content rating preference.

In still another aspect, the mobile device 116 can contain an access controller 306 that can facilitate controlling access to the content rating preference settings and/or secure content folder associated with the mobile device 116. The access controller 306 can control access to the content rating preference settings and/or secure content folder based in part on a respective security code. To gain access to the content rating preference settings, a proper security code related to the content rating preference settings has to be provided (e.g. provided to the mobile device 116 when the mobile device 116 performs content filtering, provided to the core network 202 when the core network performs content filtering). To gain access to the secure content folder, a proper security code related to the secure content folder has to be provided (e.g., provided to the mobile device 116 when the mobile device 116 performs content filtering, provided to the core network 202 when the core network performs content filtering). The respective security codes can be the same or can be different, as desired.

In yet another aspect, the mobile device 116 can comprise an evaluator 308 that can evaluate information (e.g., content) received or stored in the mobile device 116 to facilitate making determinations related to the control (e.g., flow) of information associated with the mobile device 116. In accordance with an embodiment, the mobile device 116 optionally can employ a content filter 310 that can facilitate filtering content contained in a message (e.g., SMS message, EMS message, MMS message, . . . ) received from a content provider 204 based at least in part on a content rating preference specified by a user of the mobile device 116. The content filter 310 can work in conjunction with the evaluator 308 to filter content. For instance, the evaluator 308 can evaluate content provided by a content provider 204 along with a specified content rating preference to determine whether the provided content is to be filtered out. If the evaluator 308 determines that the content is to be filtered out, the content filter 310 can filter out the provided content to discard the content or store the filtered content in a secure content folder, as desired.

In another aspect, the mobile device 116 optionally can include a rating generator 312 that can facilitate generating a content rating for content that the mobile device 116 is sending to another device (e.g., mobile device 122). The rating generator 312 can automatically generate a content rating based at least in part on analyzing the content to be sent, or the rating generator 312 can generate a rating based in part on input from the user. The content rating can be provided with the content when the message comprising the content is sent from the mobile device 116 to another mobile device (e.g., 122). In yet another aspect, the rating generator 312 can determine or infer a rating for content (e.g., content that does not include a content rating) provided to the mobile device 116 by a content provider 204 based at least in part on predefined content rating criteria. The determined or inferred content rating can be associated with the content, and the evaluator 308 in conjunction with the content filter 310 can determine whether the provided content is to be filtered out or received by the mobile device 116 based at least in part on the determined or inferred content rating. The evaluator 308 can work in conjunction with the rating generator 312 to facilitate determining content ratings for content.

In another aspect, the mobile device 116 can comprise a data store 314 that can store information, such as data, content rating preference information, content rating information, predefined content rating criteria, command information, protocol information, security code information, access control information, content filtering information, and/or information related to the mobile device 116 and communication in the wireless communication environment. For instance, command information can be retrieved from the data store 314 to facilitate generating a command to communicate a desired content rating preference to the core network 202 to facilitate filtering content that content providers 204 attempt to send to the mobile device 116.

In accordance with an aspect, the data store 314 described herein can comprise volatile memory and/or nonvolatile memory. By way of illustration, and not limitation, nonvolatile memory can include read only memory (ROM), programmable ROM (PROM), electrically programmable ROM (EPROM), electrically erasable PROM (EEPROM), flash memory, and/or nonvolatile random access memory (NVRAM). Volatile memory can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). The data store 314 is intended to comprise, without being limited to, these and any other suitable types of memory.

Figure 4:
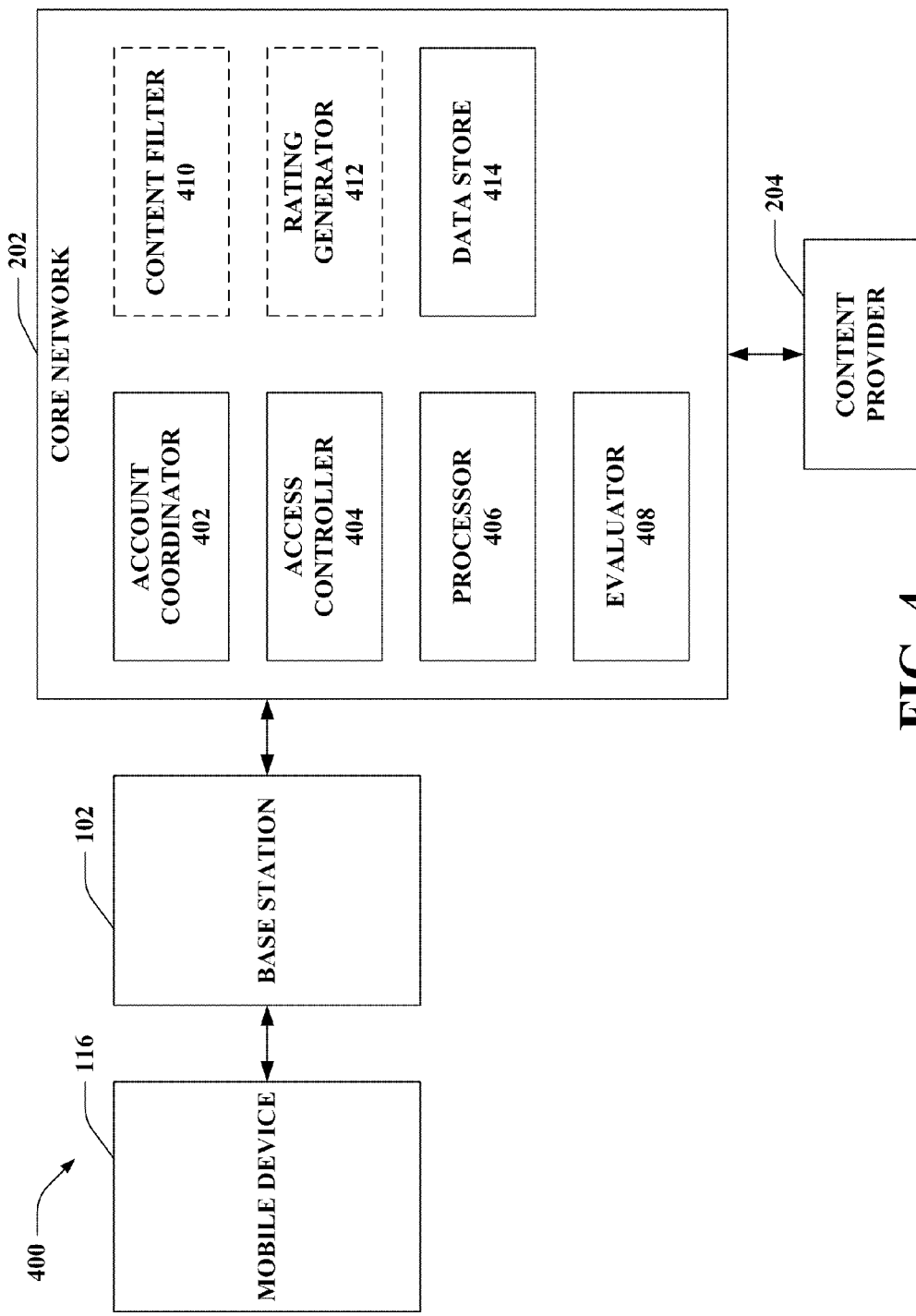
FIG. 4 is an illustration of an example system that can employ content ratings to facilitate filtering of content provided to a mobile device in accordance with an aspect of the disclosed subject matter.

Turning to FIG. 4, illustrated is an example system 400 that can employ content ratings to facilitate filtering of content provided to a mobile device in accordance with an aspect of the disclosed subject matter. System 400 can comprise a mobile device 116 that can communicate (e.g., voice, data) in a wireless network environment. System 400 also can include a base station 102 that can be a base station serving and in connection with a mobile device 116 in the wireless communication environment. The mobile device 116 can be connected to a core network 202 via the base station 102. One or more content providers 204 can be associated with the core network 202 to facilitate sending content to mobile devices (e.g., 116) associated with the core network 202. It is to be appreciated and understood that the mobile device 116, base station 102, core network 202, and content provider(s) 204 each can be the same or similar as, and/or can comprise the same or similar functionality as, respective components, such as more fully described herein, for example, with regard to system 100, system 200, and/or system 300. It is to be further appreciated and understood that, while only one mobile device 116, one base station 102, and one content provider 204 are depicted in system 400, the subject innovation is not so limited, as system 400 can include virtually any desired number of mobile devices 116, base stations 102, and content providers 204.

In accordance with an aspect, the core network 202 can include an account coordinator 402 that can manage and maintain one or more user accounts respectively associated with one or more users associated with mobile devices 116. The user accounts can include information, such as identification information related to the user and/or mobile device 116, content rating preference information, security information (e.g., security code information), and/or other information associated with an associated user or mobile device 116. When content directed to a mobile device 116 of the user is received by the core network 202, the account coordinator 402 can facilitate accessing the user account of the user to retrieve the content rating preference of the user to facilitate filtering content that a content provider 204 is attempting to send to the mobile device 116 of the user.

In still another aspect, the core network 202 can contain an access controller 404 that can facilitate controlling access to the content rating preference settings and/or secure content folder associated with the mobile device 116. The access controller 404 can control access to the content rating preference settings and/or secure content folder based in part on a respective security code. To gain access to the content rating preference settings, a proper security code related to the content rating preference settings has to be provided to the access controller 404. To gain access to the secure content folder, a proper security code related to the secure content folder has to be provided to the access controller 404. A security code can be provided via the mobile device 116 (e.g., enter security code into mobile device 116 and transmit to the core network 202, call representative of core network 202, . . . ), a web site associated with the core network 202, and/or using another communication device that can provide the security code to the core network 202. The respective security codes can be the same or can be different, as desired.

In yet another aspect, the core network 202 can comprise a processor 406 that can comprise a processor(s), microprocessor(s), and/or controller(s) dedicated to analyzing information received by or stored in the core network 202, generating information for transmission by the core network 202, and/or controlling one or more components of the core network 202. In another aspect, the core network 202 can comprise an evaluator 408 that can evaluate information (e.g., content) received or stored in the core network 202 to facilitate making determinations related to the control (e.g. flow) of information associated with the core network 202 and mobile devices (e.g., 116, 122) associated with the core network 202.

In accordance with an embodiment, the core network 202 optionally can employ a content filter 410 that can facilitate filtering content that can be contained in a message(s) (e.g., SMS message(s), EMS message(s), MMS message(s), ... ) from a content provider(s) 204 to a mobile device(s) 116 based at least in part on a content rating preference specified by a user of the mobile device 116. The content filter 410 can work in conjunction with the evaluator 408 to filter content. For instance, the evaluator 408 can evaluate content provided by a content provider 204 along with a specified content rating preference associated with the mobile device 116 to determine whether the provided content is to be filtered out or delivered to the mobile device 116. If the evaluator 408 determines that the content is to be filtered out, the content filter 410 can filter out the provided content to discard the content or store the filtered content in a secure content folder, as desired.

In another aspect, the core network 202 optionally can include a rating generator 412 that can facilitate generating a content rating for content (e.g., unrated content) that a content provider 204 is attempting to send to a mobile device 116. The rating generator 412 can automatically determine or infer a rating for content provided by a content provider 204 and can automatically generate a content rating for content that a content provider is attempting to send to a mobile device 116 based at least in part on analyzing the provided content and predefined content rating criteria. The content rating can be associated with the content and the generated content rating can be evaluated by the evaluator 408 in conjunction with the content filter 410 to determine whether the content is to be filtered out or sent to the mobile device 116. The evaluator 408 can work in conjunction with the rating generator 412 to facilitate analyzing and determining content ratings for content.

In still another aspect, the core network 202 can contain a data store 414 that can store information, such as data, content rating preference information, content rating information, predefined content rating criteria, command information, protocol information, security code information, access control information, content filtering information, user account information, and/or other information related to the core network 202, a base station(s) 102, or a mobile device (e.g., 116), and/or information otherwise related to communication in the wireless communication environment. For instance, when content is being sent to a mobile device 116 by a content provider 204, the core network 202 can retrieve a content rating preference(s) from the user account of the user associated with the mobile device 116 to facilitate evaluating the content rating of the provided content based at least in part on the content rating preference(s) associated with the mobile device 116 to facilitate determining whether the provided content is to be filtered out in order to facilitate efficient filtering of undesired content.

In accordance with an aspect, the data store 414 described herein can comprise volatile memory and/or nonvolatile memory. By way of illustration, and not limitation, nonvolatile memory can include read only memory (ROM), programmable ROM (PROM), electrically programmable ROM (EPROM), electrically erasable PROM (EEPROM), flash memory, and/or nonvolatile random access memory (NVRAM). Volatile memory can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The data store 414 is intended to comprise, without being limited to, these and any other suitable types of memory.

Figure 5:
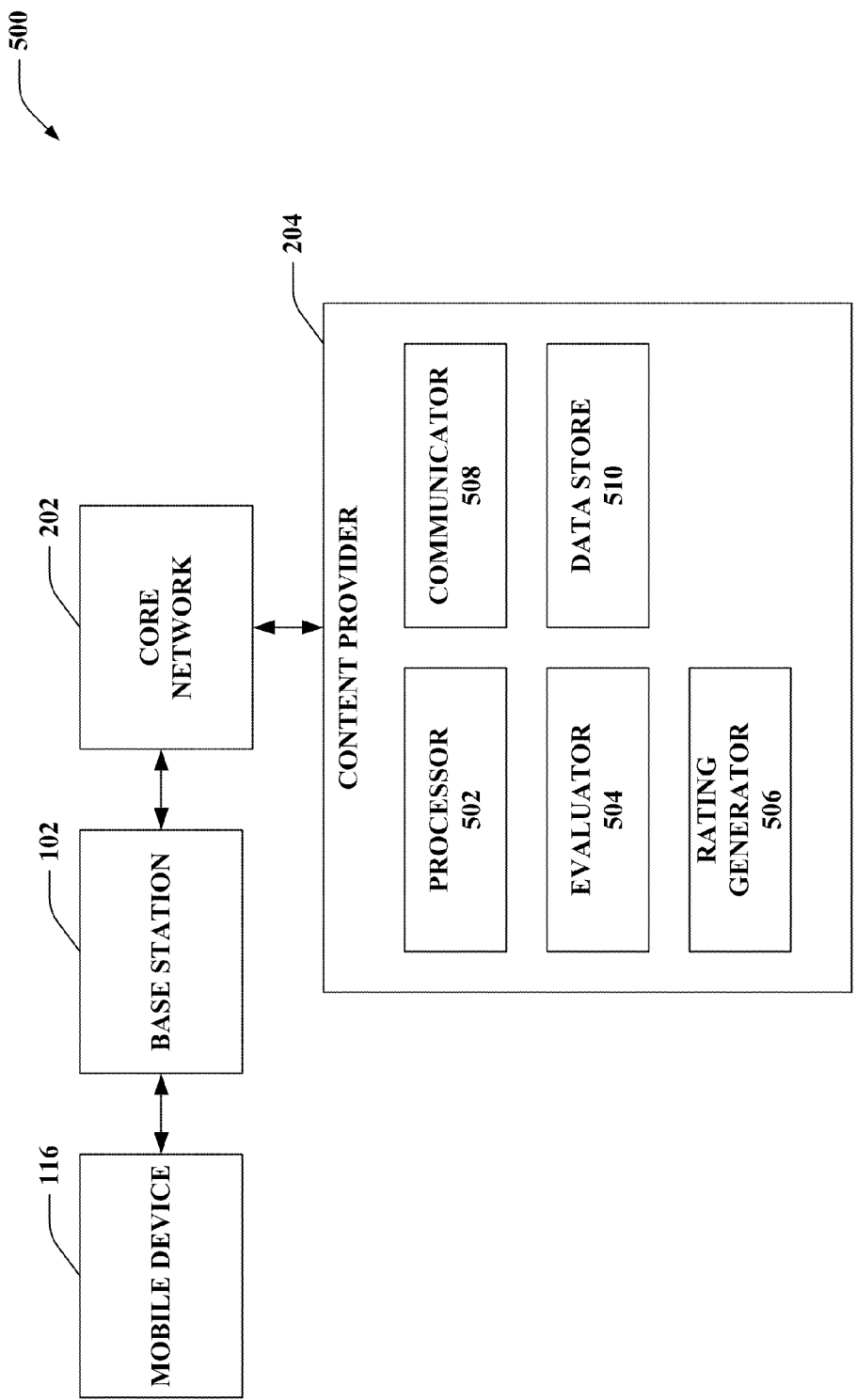
FIG. 5 is a depiction of an example system that can employ content ratings to facilitate filtering of content provided to a mobile device in accordance with an aspect of the disclosed subject matter.

FIG. 5 depicts an example system 500 that can employ content ratings to facilitate filtering of content provided to a mobile device in accordance with an aspect of the disclosed subject matter. System 500 can comprise a mobile device 116 that can communicate (e.g., voice, data) in a wireless network environment. System 500 also can include a base station 102 that can be a base station serving and in connection with a mobile device 116 in the wireless communication environment. The mobile device 116 can be connected to a core network 202 via the base station 102. One or more content providers 204 can be associated with the core network 202 to facilitate sending messages (e.g., SMS messages, EMS messages, MMS messages, ... ) comprising content (and/or associated content ratings) to mobile devices (e.g., 116) associated with the core network 202. It is to be appreciated and understood that the mobile device 116, base station 102, core network 202, and content provider(s) 204 each can be the same or similar as, and/or can comprise the same or similar functionality as, respective components, such as more fully described herein, for example, with regard to system 100, system 200, system 300, and/or system 400. It is to be further appreciated and understood that, while only one mobile device 116, one base station 102, and one content provider 204 are depicted in system 500, the subject innovation is not so limited, as system 500 can include virtually any desired number of mobile devices 116, base stations 102, and content providers 204.

In accordance with an aspect, the content provider 204 can include a processor 502 that can comprise a processor(s), microprocessor(s), and/or controller(s) dedicated to analyzing information received by or stored by the content provider 204, generating information for transmission by the content provider 204, and/or controlling one or more components of the content provider 204. In another aspect, the content provider 204 can comprise an evaluator 504 that can evaluate information (e.g., content) that the content provider 204 desires to provide to a mobile device(s) (e.g., 116, 122) to facilitate determining respective content ratings for respective pieces of content based at least in part on predefined content rating criteria.

In another aspect, the content provider 204 can comprise a rating generator 506 that can facilitate generating a content rating for content that the content provider 204 desires to send to a mobile device(s) 116. The rating generator 506 can automatically determine or infer a rating for content provided by a content provider 204 and can automatically generate a content rating for content that a content provider desires to send to a mobile device(s) 116 based at least in part on analyzing the provided content and predefined content rating criteria. The content rating can be associated with the content, where the content rating can be contained in a rating subparameter or header (e.g., SMS subparameter: Rating, EMS Header: Rating) within the message comprising the content and/or the content rating can be contained in the body of the message where a keyword(s) can be employed to indicate where the content rating is in the body of the message. The evaluator 504 can work in conjunction with the rating generator 506 to facilitate analyzing and determining content ratings for content.

In yet another aspect, the content provider 204 can include a communicator 508 that can facilitate receiving information (e.g., receiving information from a core network 202, receiving information from a mobile device 116, etc.) and/or transmitting information (e.g., transmitting content with content rating to a mobile device(s) 116 via the core network 202) associated with the content provider 204. In still another aspect, the content provider 204 can contain a data store 510 that can store information, such as data (e.g., content), information related to determining and generating content ratings for content, protocol information, predefined content rating criteria, and/or other information related to the content provider 204, the core network 202, a base station(s) 102, or a mobile device (e.g., 116), and/or information otherwise related to communication in the wireless communication environment. For instance, the content provider 204 can retrieve content and predefined content rating criteria from the data store 510 to facilitate determining a content rating for the content prior to sending the content to a mobile device(s) 116 to facilitate efficient filtering of undesired content.

In accordance with an aspect, the data store 510 described herein can comprise volatile memory and/or nonvolatile memory. By way of illustration, and not limitation, nonvolatile memory can include read only memory (ROM), programmable ROM (PROM), electrically programmable ROM (EPROM), electrically erasable PROM (EEPROM), flash memory, and/or nonvolatile random access memory (NVRAM). Volatile memory can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). The data store 510 is intended to comprise, without being limited to, these and any other suitable types of memory.

Referring to FIGS. 6-9, methodologies relating to efficiently rating content of content providers and filtering content (e.g., undesired content) sent by content providers to mobile devices (e.g., 116) in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

Figure 6:
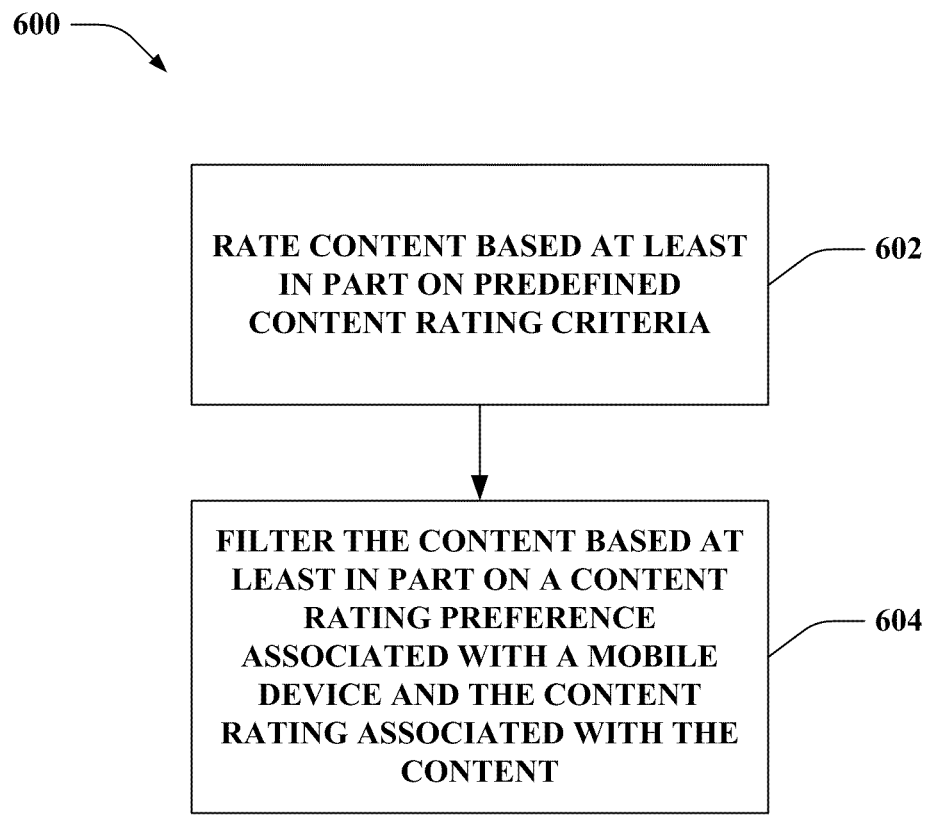
FIG. 6 is an illustration of an example methodology that can facilitate filtering content being transmitted to a mobile device(s) to facilitate communications associated with the mobile device in a wireless communication environment in accordance with an aspect of the disclosed subject matter.

With reference to FIG. 6, illustrated is an example methodology 600 that can facilitate filtering content being transmitted to a mobile device(s) to facilitate communications associated with the mobile device in a wireless communication environment in accordance with an aspect of the disclosed subject matter. At 602, content can be rated based at least in part on predefined content rating criteria. In one aspect, a content provider 204 can rate content, such as content that the content provider 204 desires to send to a mobile device(s) 116, based at least in part on a predefined content rating criteria. For example, the content can be rated such that content that is more adult-oriented content can be given a higher content rating than more benign content to facilitate filtering of undesired content (e.g., adult-oriented content). The content provider 204 can send a message(s) (e.g., SMS messages, EMS messages, MMS messages) comprising the content and/or an associated content rating to the mobile device(s) 116 via the core network 202. In accordance with various embodiments, a core network 202 and/or a mobile device (e.g., 116) in the core network 202 can rate content, such as unrated content provided by a content provider 204, to facilitate filtering content provided to a mobile device 116.

In another aspect, a subparameter or header (e.g. SMS subparameter: Rating, EMS Header: Rating) can be added to message protocol and the content rating can be contained in the subparameter or header of the message. Alternatively, the content rating can be contained in the body of the message, where a keyword(s) can be included in the message to facilitate indicating where the content rating is contained in the message.

At 604, the content can be filtered based at least in part on a content rating preference associated with the mobile device 116 and the content rating associated with the content. In an embodiment, when a content provider 204 attempts to send content to a mobile device(s) 116, the core network 202 can first receive the content and can retrieve the content rating from the message, or can determine and infer a content rating for the content (e.g., unrated content). The core network 202 can retrieve the content rating preference associated with the mobile device 116 from a user account of the user associated with the mobile device 116. The core network 202 can analyze the content rating of the content based at least in part on the content rating preference of the mobile device 116 (e.g., the core network 202 can compare the content rating value to the content rating preference value). If the core network 202 determines that the content rating is higher than the content rating preference, the core network 202 can filter out the content; and if the core network 202 determines that the content rating is at or lower than the content rating preference, the core network 202 can determine that the content can be provided to the mobile device 116, and can send the content to the mobile device 116.

In accordance with another embodiment, the mobile device 116 can perform the content filtering. When a content provider 204 attempts to send content to the mobile device 116, the content can be routed to the mobile device 116 via the core network 202. Prior to allowing a user to perceive content (e.g., prior to displaying content), the mobile device 116 can retrieve the content rating from the message, or can determine and infer a content rating for the content (e.g., unrated content). The mobile device 116 can retrieve the content rating preference associated with the mobile device 116 from a data store 314 in the mobile device 116. The mobile device 116 can analyze the content rating of the content based at least in part on the content rating preference of the mobile device 116 (e.g. the mobile device 116 can compare the content rating value to the content rating preference value). If the mobile device 116 determines that the content rating is higher than the content rating preference, the mobile device 116 can filter out the content; and if the mobile device 116 determines that the content rating is at or lower than the content rating preference, the mobile device 116 can determine that the content can be received by the mobile device 116 and can be perceived by a user(s) of the mobile device 116.

In another aspect, content that has been filtered out can be placed in a secure content folder, as desired, where the secure content folder can be stored in the core network 202 (e.g., when the core network 202 performs content filtering) or in the mobile device 116 (e.g., when the mobile device 116 performs content filtering). The secure content folder cannot be accessed unless a proper security code associated with the secure content folder is submitted. An entity (e.g., parent of a child who is using the mobile device 116) can submit a proper security code associated with the secure content folder to the core network 202 (e.g., when the core network 202 contains the secure content folder) or mobile device 116 (e.g., when the mobile device 116 contains the secure content folder) to facilitate accessing content in the secure content folder.

Figure 7:
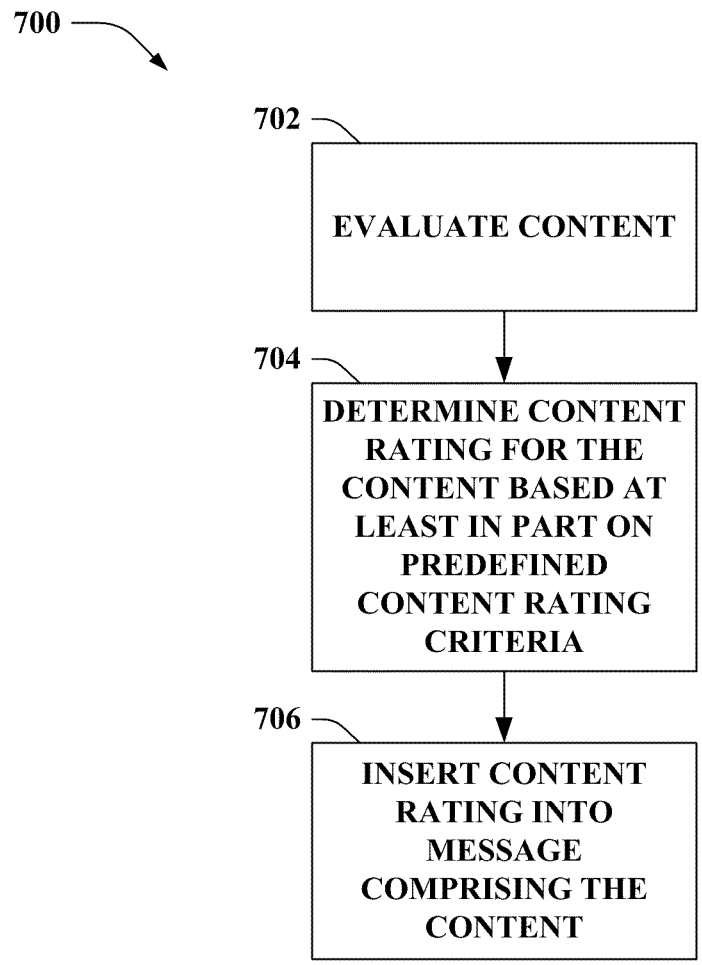
FIG. 7 is an illustration of an example methodology that can determine content ratings for content to facilitate filtering content being transmitted to a mobile device(s) in a wireless communication environment in accordance with an aspect of the disclosed subject matter.

Referring to FIG. 7, depicted is an example methodology 700 that can determine content ratings for content to facilitate filtering content being transmitted to a mobile device(s) in a wireless communication environment in accordance with an aspect of the disclosed subject matter. At 702, content can be evaluated. In one embodiment, a content provider 204 can evaluate content, such as content that the content provider 204 desires to send to a mobile device(s) 116. In accordance with various other embodiments, a core network 202 and/or a mobile device(s) 116 connected with the core network 202 can evaluate content, such as unrated content, received from a content provider 204. The content can be evaluated using predefined content rating criteria to facilitate generating a content rating for the content to facilitate filtering content (e.g., filtering out undesired content, such as adult-oriented content) being sent to the mobile device(s) 116.

At 704, a content rating(s) for the content can be determined based at least in part on predefined content rating criteria. In one embodiment, the content provider 204 can determine and generate a content rating(s) for content based at least in part on the predefined content rating criteria. In accordance with various other embodiments, the core network 202 and/or the mobile device(s) 116 connected with the core network 202 can determine the content rating for content (e.g., previously unrated content) received from a content provider 204 based at least in part on the predefined content rating criteria to facilitate generating a content rating for the content.

At 706, the content rating can be inserted into a message comprising the content. In one aspect, the content provider 204 can insert the content rating applicable to the content into a message that contains the content. In another aspect, a subparameter or header (e.g., SMS subparameter: Rating, EMS Header: Rating) can be added to message protocol and the content rating can be contained in the subparameter or header of the message. Alternatively, the content rating can be contained in the body of the message, where a keyword(s) can be included in the message to facilitate indicating where the content rating is contained in the message.

In accordance with an embodiment, the core network 202 can insert the content rating into the message containing the content when the core network 202 evaluates and determines a content rating for content and then provides the content to the mobile device(s) 116, where the mobile device(s) 116 performs the content filtering process. It is to be appreciated and understood that it typically is not necessary for the mobile device 116 or core network 202 to determine and generate a content rating when the content provider has provided a content rating with the content. It is to be further appreciated and understood that, as desired, unrated content from a content provider 204 can remain unrated (e.g., the core network 202 and mobile device 116 do not evaluate and determine a content rating for unrated content), and as specified by the content filtering protocol or content rating preference associated with the mobile device 116, the unrated content can be delivered to the mobile device 116, can be stored in a secure content folder that can be accessed with a proper security code, or can be discarded.

Figure 8:
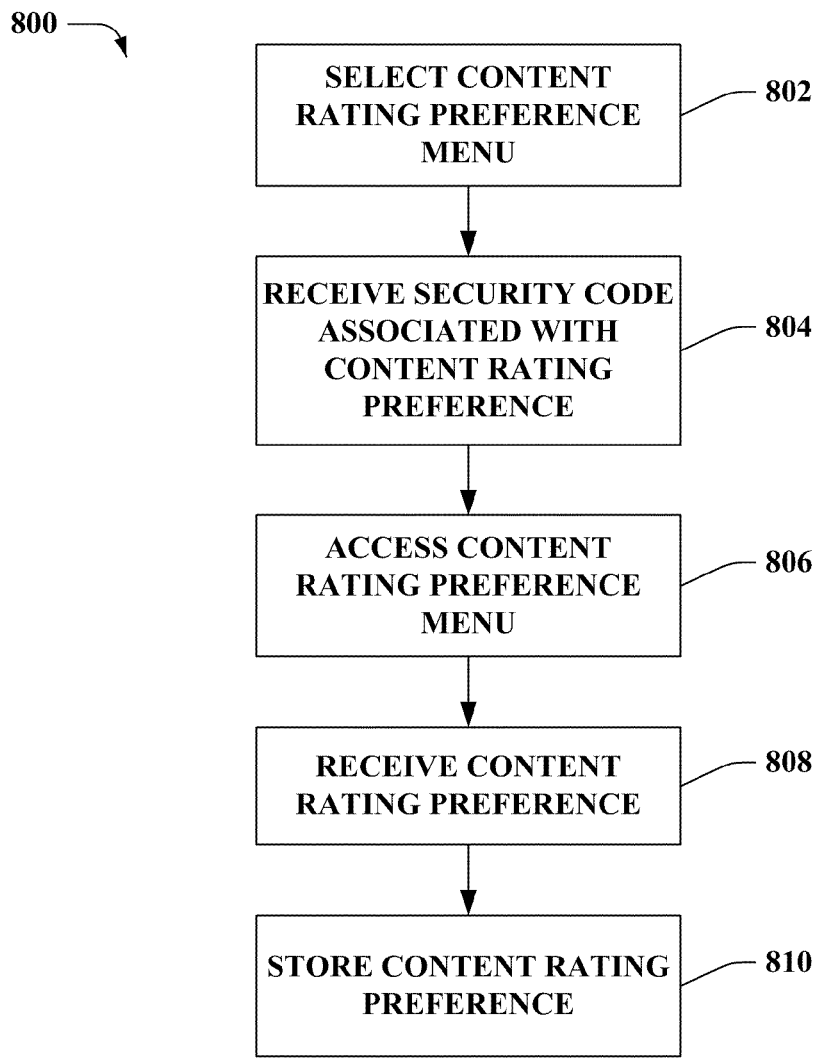
FIG. 8 is a depiction of an example methodology that can establish a content rating preference of a mobile device to facilitate filtering content being transmitted to a mobile device in a wireless communication environment in accordance with an aspect of the disclosed subject matter.

FIG. 8 illustrates an example methodology 800 that can establish a content rating preference of a mobile device to facilitate filtering content being transmitted to a mobile device in a wireless communication environment in accordance with an aspect of the disclosed subject matter. At 802, a content rating preference menu can be selected. In one aspect, a user can navigate through menus on a mobile device 116 and can select a content rating preference menu. At 804, a security code associated with the content rating preference can be received. In an aspect, the user can enter a security code related to the content rating preference and the mobile device 116 can receive the entered security code.

At 806, the content rating preference menu can be accessed. In an aspect, the mobile device 116 can analyze the received security code to determine whether the received security code is valid. If the mobile device 116 determines that the security code is valid, the mobile device 116 can grant access to the content rating preference menu and this menu can be accessed. If the mobile device 116 determines that the security code is not valid, the mobile device 116 can deny access to the content rating preference menu. In accordance with various other aspects, when the core network 202 is performing content filtering of content from content providers 204, the security code also can be provided to a web site associated with the core network 202, or a representative (e.g., person, automated representative) via a voice call, or by another form of communication using a communication device to facilitate accessing the content rating preference menu associated with the mobile device 116.

At 808, a content rating preference can be received. In one aspect, a desired content rating preference can be entered into the mobile device 116 and received into the content rating preference settings. In accordance with various other aspects, when the core network 202 is performing content filtering of content from content providers 204, the content rating preference also can be provided to a web site associated with the core network 202, or a representative (e.g., person, automated representative) via a voice call, or by another form of communication using a communication device, and received by the core network 202, to facilitate accessing the content rating preference menu associated with the mobile device 116.

At 810, the content rating preference can be stored. In one aspect, the mobile device 116 and/or core network 202 can store the content rating preference for the mobile device 116, as specified by the user, in the content rating preference settings. The core network 202 can store the content rating preference associated with the mobile device 116 in a user account associated with the mobile device user, where the user account can be stored in a data store 414 in the core network 202. The mobile device 116 can store the specified content rating preference in a data store 314 in the mobile device 116, as desired. The desired content rating preference associated with the mobile device 116 can be retrieved and utilized to facilitate content filtering when the core network 202 receives a message(s) (e.g., SMS message(s), EMS message(s), MMS message(s), . . . ) comprising content (and/or an associated content rating) that being sent from a content provider 204 to a mobile device(s) 116. The content can be filtered based at least in part on the content rating preference for the mobile device 116 and the content rating associated with the content.

Figure 9:
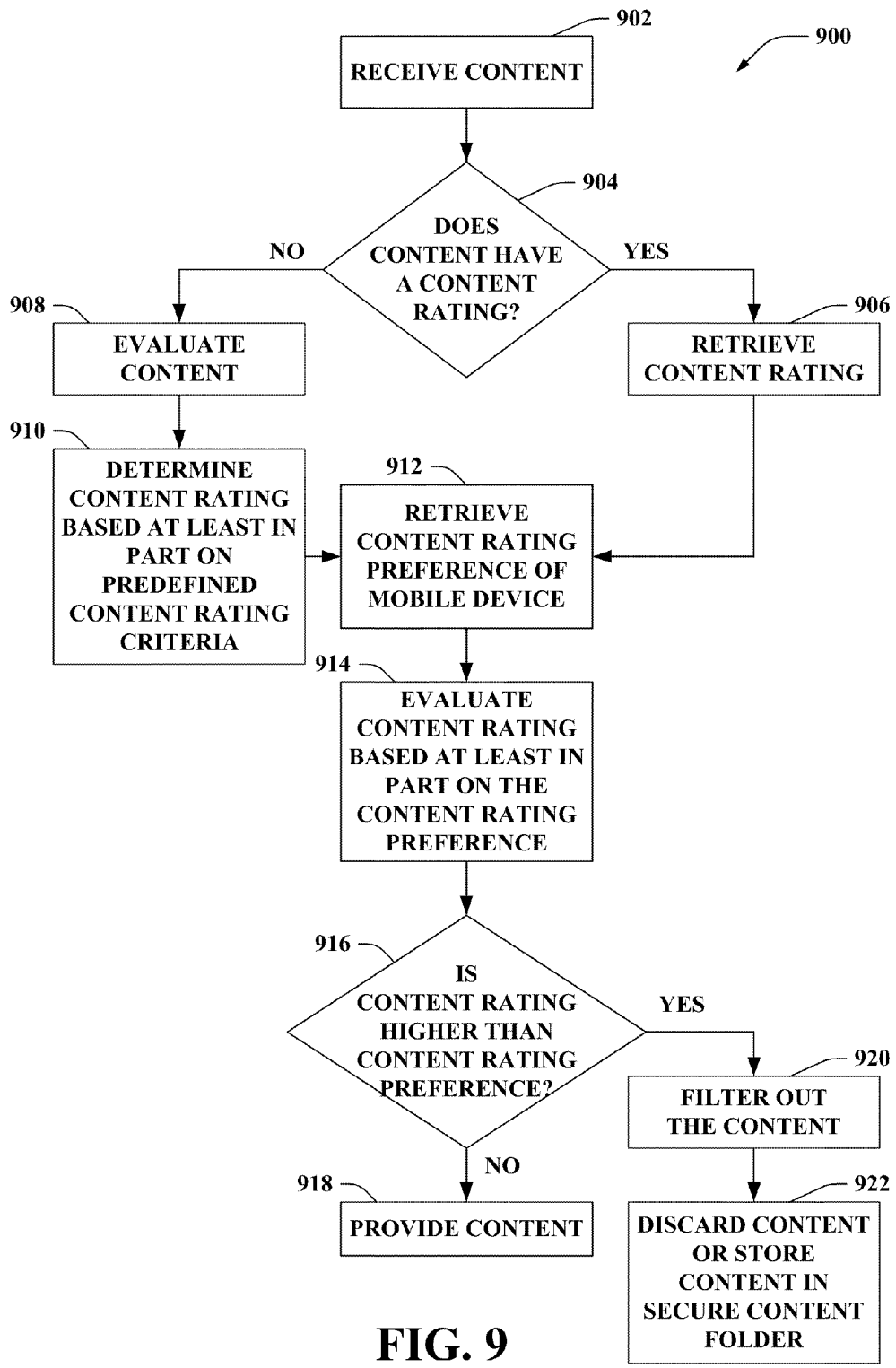
FIG. 9 is an illustration of an example methodology that can filter content being transmitted to a mobile device in a wireless communication environment in accordance with an aspect of the disclosed subject matter.

FIG. 9 illustrates an example methodology 900 that can filter content being transmitted to a mobile device in a wireless communication environment in accordance with an aspect of the disclosed subject matter. At 902, content can be received. In accordance with one embodiment, if the core network 202 is performing content filtering, the core network 202 can receive a message (e.g., SMS message(s), EMS message(s), MMS message(s), . . . ) comprising content from a content provider 204. In accordance with another embodiment, if a mobile device 116 is performing content filtering, the mobile device 116 can receive a message comprising content from a content provider 204 via the core network 202 and base station 102.

At 904, a determination can be made as to whether the content contains a content rating. In one aspect, the core network 202 and/or mobile device 116 (e.g., whichever is performing the content filtering) can analyze the message to determine whether a content rating associated with the content is included in the message. In an aspect, the content rating can be contained in a rating subparameter or rating header of the message, or can be contained in the body of the message where a keyword(s) in the message can facilitate identifying a content rating. If it is determined that the content has an associated content rating, at 906, the content rating can be retrieved. In one aspect, the core network 202 and/or mobile device 116 can retrieve the identified content rating for the content from the message. Methodology 900 can proceed to reference numeral 912 at this point.

If, at 904, it is determined that the content does not have a content rating associated therewith, at 908, the content can be evaluated. In an aspect, the core network 202 and/or mobile device 116 can determine that there is no content rating for the content provided in the message. The core network 202 and/or mobile device 116 can evaluate the content (e.g., parse text and/or images in the content) to facilitate determining a content rating for the content based at least in part on predefined content rating criteria (e.g. the content can be compared to the predefined content rating criteria). At 910, a content rating for the content can be determined based at least in part on the predefined content rating criteria. In an aspect, the core network 202 and/or mobile device 116 can determine a content rating for the content based at least in part on the predefined content rating criteria. For example, content that is highly adult-oriented (e.g., content contains sexually explicit text or images, content contains very violent text or images, content contains highly obscene text or images, . . . ) can be assigned a higher content rating value than content that is more benign. Methodology 900 can proceed to reference numeral 912.

At 912, a content rating preference associated with the mobile device 116 can be retrieved. In accordance with an aspect, the core network 202 and/or mobile device 116 can retrieve the content rating preference associated with the mobile device 116. The core network 202 can retrieve the content rating preference from a user account associated with the mobile device 116 in the data store 414 in the core network 202. The mobile device 116 can retrieve the content rating preference from its data store 314.

At 914, the content rating of the content can be evaluated based at least in part on the content rating preference associated with the mobile device 116. In an aspect, the core network 202 and/or mobile device 116 can evaluate the content, for example, by comparing the content rating of the content with the content rating preference associated with the mobile device 116 to facilitate determining whether the content can be received by the mobile device 116 (e.g., received and perceived) or is to be filtered out.

At 916, a determination can be made as to whether the content rating of the content has a higher value than the content rating preference associated with the mobile device 116. In one aspect, based at least in part on the results of the evaluation of the content rating of the content, the core network 202 and/or mobile device 116 can determine whether the content can be received by the mobile device 116 (e.g., received and perceived) or is to be filtered out. If, at 916, it is determined that the content rating is at or lower than the content rating preference, it can be determined that the content rating of the content meets the content rating threshold for allowing the content to be received by the mobile device 116, and at 918, the content can be provided to the mobile device 116. For instance, the core network 202 can determine that the content rating of the content is lower than the content rating preference and can be deemed below the content rating threshold, and the core network 202 can send the content to the mobile device 116. If the mobile device 116 is performing the content filtering, and the mobile device 116 determines that the content rating of the content is at or lower than the content rating preference of the mobile device 116, the mobile device 116 can received the content and a user of the mobile device 116 can perceive the content, as desired.

Referring again to reference numeral 916, if, at 916, it is determined that the content rating of the content is higher than the content rating preference associated with the mobile device 116, at 920, the content can be filtered out. In one aspect, the core network 202 and/or mobile device 116 (e.g., whichever is performing content filtering) can filter out the content so that the content is not sent to and/or received by the mobile device 116 (e.g., received by the mobile device 116 for viewing or otherwise perceiving).

At 922, as desired, the filtered out content can be discarded (e.g., deleted) or can be stored in a secure content folder. In one aspect, the core network 202 and/or mobile device 116 can discard the content or store the content in a secure content folder (e.g., secure content folder in the core network 202, or secure content folder in the mobile device 116). A user (e.g., parent) of the mobile device 116 can access the secure content folder by providing a valid security code for the secure content folder to the core network 202 (e.g., when the secure content folder is stored in the core network 202) or entering a valid security code in the mobile device 116 (e.g., when the secure content folder is stored in the mobile device 116). In another aspect, the user can access a secure content folder stored in the core network 202 by providing a valid security code via a web site associated with the core network 202.

It will be appreciated that, in accordance with one or more aspects described herein, inferences can be made relating to determining a content rating associated with content, determining whether content has a content rating associated therewith, determining whether content is to be filtered out or provided to a mobile device 116, determining and generating a content rating, to facilitate efficient content filtering and communication associated with the mobile device 116 in the network. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

For example, one or more methods presented above can include making an inference(s) pertaining to whether content has a content rating associated therewith, determining a content rating value for content, determining whether content is to be filtered out or provided to a mobile device 116, and/or determining and generating a content rating. It will be appreciated that the foregoing examples are illustrative in nature and are not intended to limit the number of inferences that can be made or the manner in which such inferences are made in conjunction with the various embodiments and/or methods described herein.

Figure 10:
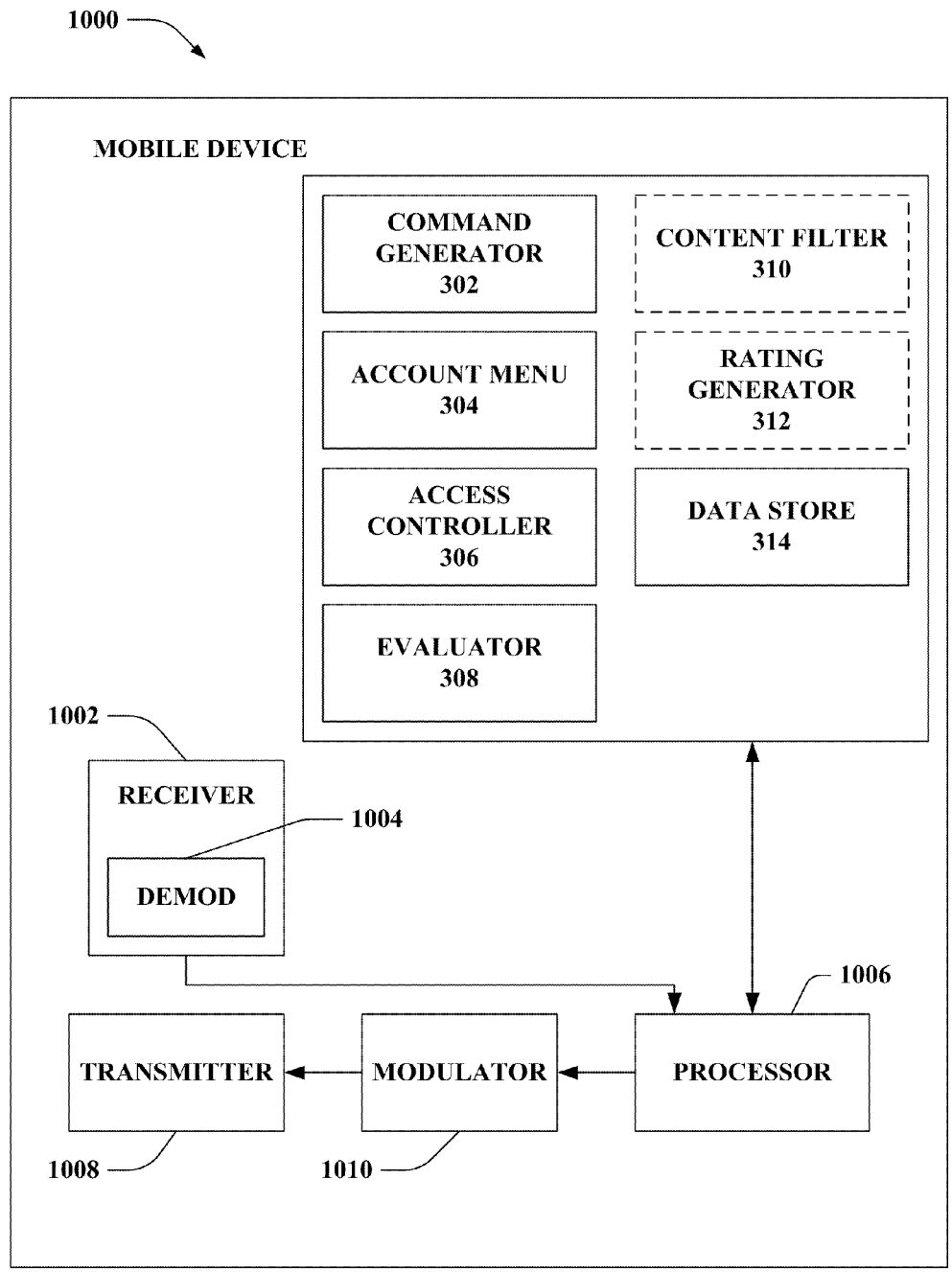
FIG. 10 is an illustration of an example mobile device that can facilitate communications associated with a mobile device in a wireless communication system in accordance with an aspect of the disclosed subject matter.

FIG. 10 is an illustration of a mobile device 1000 that can facilitate communications associated with a mobile device in a wireless communication system in accordance with an aspect of the disclosed subject matter. It is to be appreciated that the mobile device 1000 can be the same or similar as, and/or can comprise the same or similar functionality as, mobile device 116, such as more described herein, for example, with regard to system 100, system 200, system 300, system 400, system 500, methodology 600, methodology 700, methodology 800, and methodology 900.

Mobile device 1000 can comprise a receiver 1002 that receives a signal from, for instance, a receive antenna (not shown), and performs typical actions thereon (e.g., filters, amplifies, downconverts, etc.) the received signal and digitizes the conditioned signal to obtain samples. Receiver 1002 can be, for example, an MMSE receiver, and can comprise a demodulator 1004 that can demodulate received symbols and provide them to a processor 1006 for channel estimation. Processor 1006 can be a processor dedicated to analyzing information received by receiver 1002 and/or generating information for transmission by a transmitter 1008, a processor that controls one or more components of mobile device 1000, and/or a processor that both analyzes information received by receiver 1002, generates information for transmission by transmitter 1008, and controls one or more components of mobile device 1000. Mobile device 1000 can also comprise a modulator 1010 that can work in conjunction with the transmitter 1008 to facilitate transmitting signals (e.g., data) to, for instance, a base station (e.g., 102), another mobile device (e.g., 122), etc.

In one aspect, the processor 1006 can be connected to a command generator 302 that can facilitate generating a command(s), such as a command related to a content rating preference(s), which can be provided to the core network 202 to facilitate setting and/or modifying a content rating preference for the mobile device 116. The command generator 302 also can generate a command to query the core network 202 to request a current content rating preference setting associated with the mobile device 1000. The commands generated by the command generator 302 can be structured in accordance with a specified protocol (e.g., SMS protocol, EMS protocol, MMS protocol, . . . ). In another aspect, the processor 1006 can be connected with an account menu 304 that can be accessed to facilitate setting a desired content rating preference for the mobile device 1000. For instance, the account menu 304 can include a content rating preference menu that can be accessed to enter information to facilitate setting the content rating preference for the mobile device 1000.

The processor 1006 also can be connected to an access controller 306 that can facilitate controlling access to the content rating preference settings and/or secure content folder associated with the mobile device 1000. The access controller 306 can control access to the content rating preference settings and/or secure content folder based in part on respective security codes. The processor 1006 can be connected to an evaluator 308 that can evaluate information (e.g., content) received or stored in the mobile device 116 to facilitate making determinations related to the control (e.g., flow) of information associated with the mobile device 1000, and/or optionally can be configured to make determinations related to content filtering of content provided to the mobile device 1000.

In accordance with an aspect, the mobile device 1000 optionally can employ a content filter 310 that can be connected with the processor 1006, where the content filter can facilitate filtering content based at least in part on a content rating preference specified by a user of the mobile device 1000 and a content rating of content provided to the mobile device 1000 by a content provider 204. The content filter 310 can work in conjunction with the evaluator 308 to filter content. In another aspect, the mobile device 1000 optionally can include a rating generator 312 that can facilitate generating a content rating for content that the mobile device 1000 is sending to another device (e.g., mobile device 122) and/or can facilitate generating a content rating for content (e.g., previously unrated content) provided to the mobile device 1000.

Mobile device 1000 can additionally comprise data store 314 that can be operatively coupled to processor 1006 and can store data to be transmitted, received data, information related to base stations and/or cells, information related to the mobile device 1000, and/or any other suitable information that can facilitate content filtering and communication of data associated with the mobile device 1000. Data store 314 can additionally store protocols and/or algorithms associated with setting a content rating preference for the mobile device 1000, controlling access to the content rating preference menu, controlling access to the secure content folder, evaluating content and/or content ratings, filtering content, generating content ratings, generating commands, storing data, and/or other functions related to the mobile device 1000.

It is to be appreciated and understood that the command generator 302, account menu 304, access controller 306, evaluator 308, content filter 310, rating generator 312, and data store 314 each can be the same or similar as, or can comprise the same or similar functionality as, respective components such as more fully described herein, for example, with regard to system 300. It is to be further appreciated and understood that the command generator 302, account menu 304, access controller 306, evaluator 308, content filter 310, rating generator 312, and data store 314 each can be a stand-alone unit (as depicted), can be included within the processor 1006, can be incorporated within another component, and/or virtually any suitable combination thereof, as desired.

Figure 11:
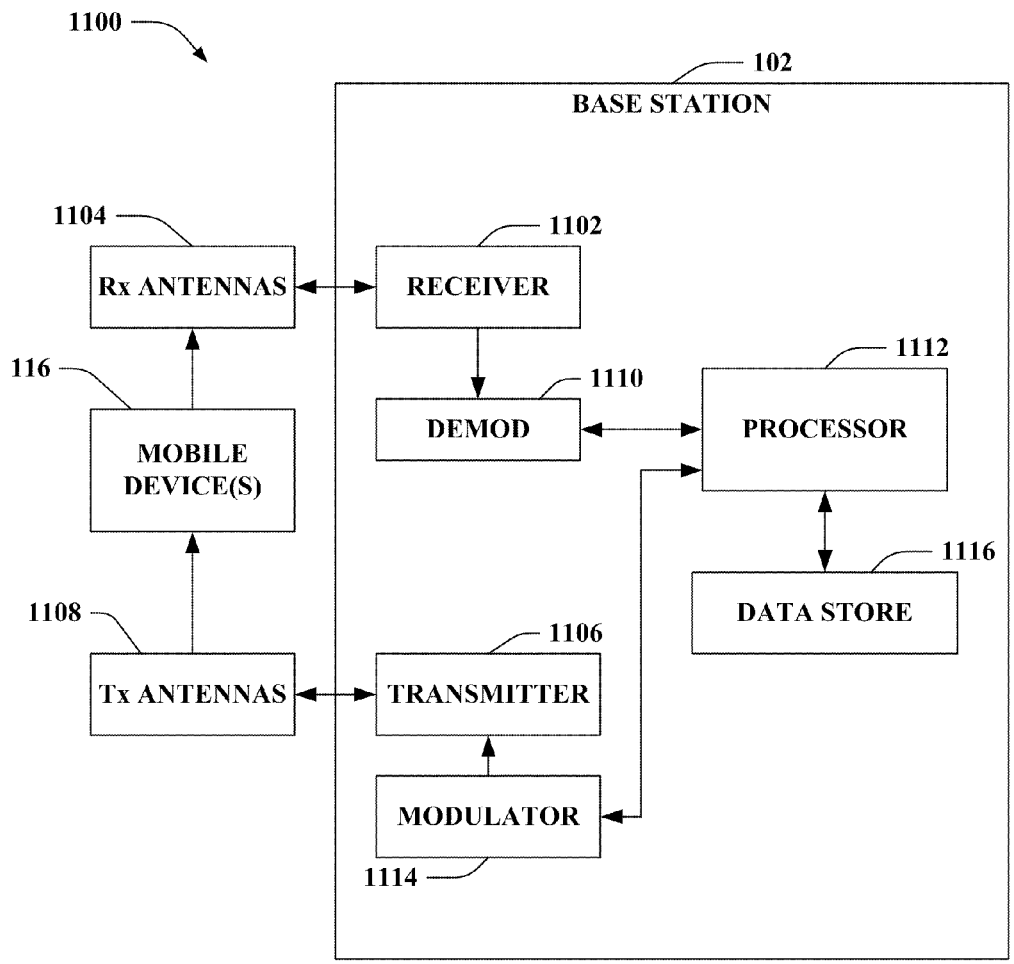
FIG. 11 is a depiction of an example system that can facilitate communications associated with a mobile device in a wireless communication system in accordance with an aspect of the disclosed subject matter.

FIG. 11 is an illustration of a system 1100 that can facilitate communications associated with a mobile device in a wireless communication system in accordance with an aspect of the disclosed subject matter. System 1100 can comprise a base station 102 (e.g., access point, . . . ). The base station 102 can include a receiver 1102 that can receive signal(s) from one or more mobile devices 116 through a plurality of receive antennas 1104, and a transmitter 1106 that can transmit signals (e.g., data) to the one or more mobile devices 116 through a transmit antenna 1108. Receiver 1102 can receive information from receive antennas 1104 and can be operatively associated with a demodulator 1110 that can demodulate received information. Demodulated symbols can be analyzed by a processor 1112 that can be a processor dedicated to analyzing information received by receiver 1102 and/or generating information for transmission by a transmitter 1106, a processor that controls one or more components of base station 102, and/or a processor that both analyzes information received by receiver 1102, generates information for transmission by transmitter 1106, and controls one or more components of base station 102. The base station 102 can also comprise a modulator 1114 that can work in conjunction with the transmitter 1106 to facilitate transmitting signals (e.g., data) to, for instance, a mobile device 116, another device, etc.

Processor 1112 can be coupled to a data store 1116 that can store data to be transmitted, received data, information related to base stations (e.g. base station 102), information related to a mobile device(s) (e.g. 116), information related to cells, and any other suitable information that can facilitate communication of information (e.g., voice, data) associated with a mobile device(s) (e.g., 116). Data store 1116 can additionally store protocols and/or algorithms associated with and facilitating communicating with a mobile device(s) (e.g., 116), another base station, cells, or another device. It is to be appreciated and understood that the data store 1116 can be a stand-alone unit (as depicted), can be included within the processor 1112, can be incorporated within another component, and/or virtually any suitable combination thereof, as desired.

In accordance with an aspect, the data store 1116 described herein can comprise volatile memory and/or nonvolatile memory. By way of illustration, and not limitation, nonvolatile memory can include read only memory (ROM), programmable ROM (PROM), electrically programmable ROM (EPROM), electrically erasable PROM (EEPROM), flash memory, and/or nonvolatile random access memory (NVRAM). Volatile memory can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The data store 1116 is intended to comprise, without being limited to, these and any other suitable types of memory.

Figure 12:
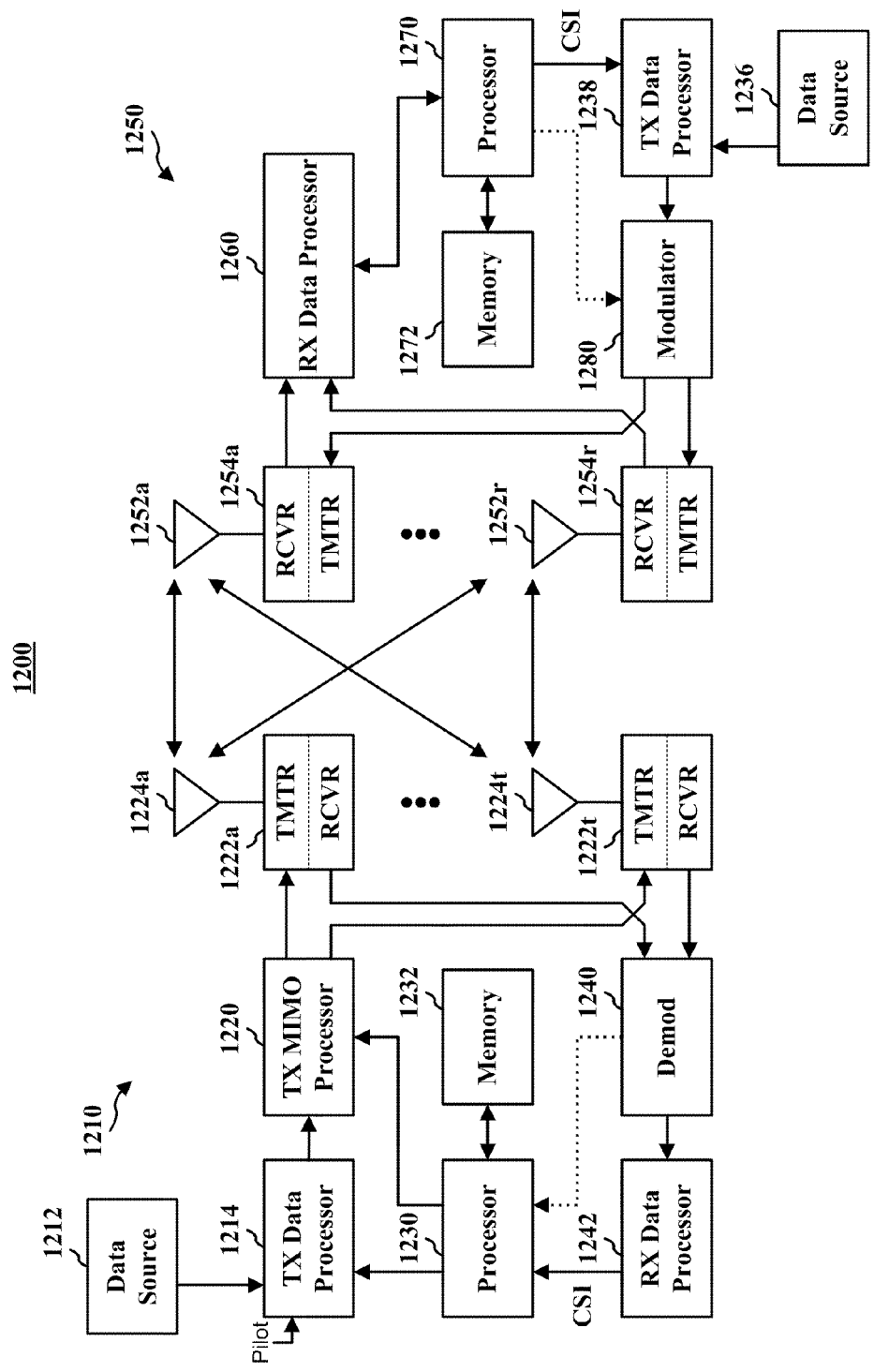
FIG. 12 is an illustration of an example wireless network system that can be employed in conjunction with the various systems and methods described herein.

FIG. 12 shows an example wireless communication system 1200 in accordance with an aspect of the disclosed subject matter. The wireless communication system 1200 depicts one base station 1210 and one mobile device 1250 for sake of brevity. However, it is to be appreciated that system 1200 can include more than one base station and/or more than one mobile device, wherein additional base stations and/or mobile devices can be substantially similar or different from example base station 1210 and mobile device 1250 described below. In addition, it is to be appreciated that base station 1210 and/or mobile device 1250 can employ the systems (FIGS. 1-5, 10-11) and/or methods (FIGS. 6-9) described herein to facilitate wireless communication there between. It is to be appreciated that base station 1210 and mobile device 1250 each can be respectively the same or similar as, and/or can comprise respectively the same or similar functionality as, respective components as more fully described herein, such as, for example, with regard to system 100, system 200, system 300, system 400, system 500, methodology 600, methodology 700, methodology 800, methodology 900, system 1000, and/or system 1100.

At base station 1210, traffic data for a number of data streams is provided from a data source 1212 to a transmit (TX) data processor 1214. According to an example, each data stream can be transmitted over a respective antenna. TX data processor 1214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1250 to estimate channel response. The multiplexed pilot and coded data for each data stream can be modulated (e.g. symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1230.

The modulation symbols for the data streams can be provided to a TX MIMO processor 1220, which can further process the modulation symbols (e.g., for OFDM). TX MIMO processor 1220 then provides $N_T$ modulation symbol streams to $N_T$ transmitters (TMTR) 1222a through 1222t. In various embodiments, TX MIMO processor 1220 applies beamforming weights to the symbols of the data streams and to the antenna from which the symbol is being transmitted.

Each transmitter 1222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1222a through 1222t are transmitted from $N_T$ antennas 1224a through 1224t, respectively.

At mobile device 1250, the transmitted modulated signals are received by $N_R$ antennas 1252a through 1252r and the received signal from each antenna 1252 is provided to a respective receiver (RCVR) 1254a through 1254r. Each receiver 1254 conditions (e.g., filters, amplifies, and downconverts) a respective signal, digitizes the conditioned signal to provide samples, and further processes the samples to provide a corresponding "received" symbol stream.

An RX data processor 1260 can receive and process the $N_R$ received symbol streams from $N_R$ receivers 1254 based on a particular receiver processing technique to provide $N_T$ "detected" symbol streams. RX data processor 1260 can demodulate, deinterleave, and decode each detected symbol stream to recover the traffic data for the data stream. The processing by RX data processor 1260 is complementary to that performed by TX MIMO processor 1220 and TX data processor 1214 at base station 1210.

A processor 1270 can periodically determine which precoding matrix to use (discussed below). Further, processor 1270 can formulate a reverse link message comprising a matrix index portion and a rank value portion.

The reverse link message can comprise various types of information regarding the communication link and/or the received data stream. The reverse link message can be processed by a TX data processor 1238, which also receives traffic data for a number of data streams from a data source 1236, modulated by a modulator 1280, conditioned by transmitters 1254a through 1254r, and transmitted back to base station 1210.

At base station 1210, the modulated signals from mobile device 1250 are received by antennas 1224, conditioned by receivers 1222, demodulated by a demodulator 1240, and processed by a RX data processor 1242 to extract the reverse link message transmitted by mobile device 1250. Further, processor 1230 can process the extracted message and can determine which preceding matrix to use for determining the beamforming weights.

Processors 1230 and 1270 can direct (e.g., control, coordinate, manage, etc.) operation at base station 1210 and mobile device 1250, respectively. Respective processors 1230 and 1270 can be associated with memory 1232 and 1272 that store program codes and data. Processors 1230 and 1270 can also perform computations to derive frequency and impulse response estimates for the uplink and downlink, respectively.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In an aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels can comprise: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), Load Indicator Channel (LICH).

The UL PHY Channels can comprise: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), Broadband Pilot Channel (BPICH).

In an aspect, a channel structure is provided that preserves low PAR (at any given time, the channel is contiguous or uniformly spaced in frequency) properties of a single carrier waveform.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 13:
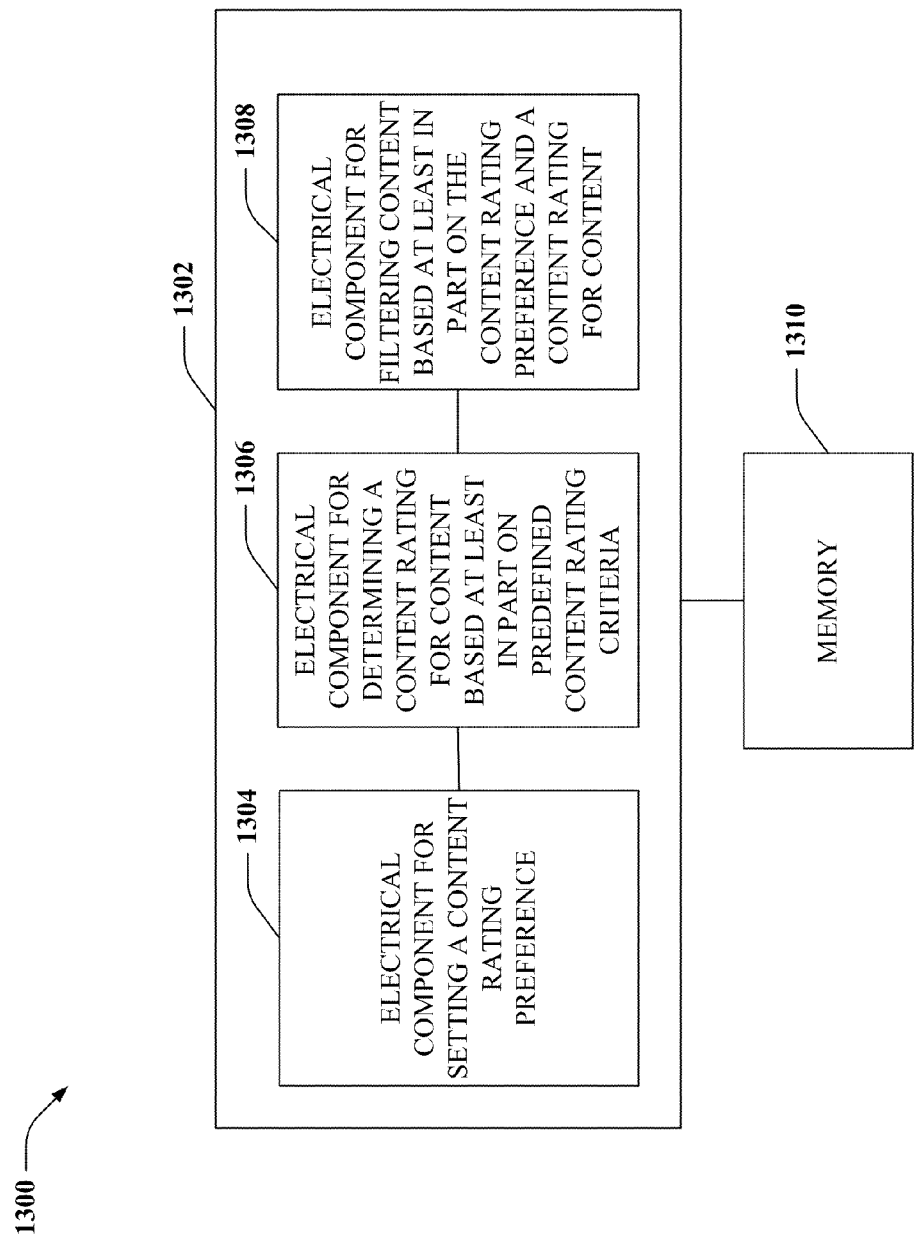
FIG. 13 is a depiction of an example system that can facilitate communication associated with a mobile device in a wireless communication environment.

With reference to FIG. 13, illustrated is a system 1300 that can facilitate communication associated with a mobile device in a wireless communication environment. For example, system 1300 can reside at least partially within a mobile device (e.g., 116). It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction.

For instance, logical grouping 1302 can include an electrical component for setting a content rating preference 1304. In one aspect, the electrical component for setting a content rating preference 1304 can facilitate access of a content rating preference menu wherein a desired content rating preference can be specified by a user of a mobile device 116 and associated with the mobile device 116. The content rating preference can be stored in the mobile device 116 and/or the core network 202.

Further, logical grouping 1302 can comprise an electrical component for determining a content rating for content (e.g., content provided by a content provider 204; content being provided from the mobile device 116 to another mobile device) based at least in part on predefined content rating criteria 1306. In one aspect, the electrical component for determining a content rating for content 1306 can determine and generate a content rating for content based at least in part on predefined content rating criteria, where the content can be evaluated using the predefined content rating criteria to facilitate determining a content rating for the content.

Logical grouping 1302 also can include an electrical component for filtering content based at least in part on the content rating preference for the mobile device 116 and a content rating for content from a content provider (e.g., 204) 1308. In one aspect, the electrical component for filtering content 1308 can filter content provided to a mobile device 116 by a content provider 204 based at least in part on a content rating associated with the provided content and a content rating preference associated with the mobile device 116. Additionally, system 1300 can include a memory 1310 that can retain instructions for executing functions associated with electrical components 1304, 1306, and 1308. While shown as being external to memory 1310, it is to be understood that one or more of electrical components 1304, 1306, and 1308 can exist within memory 1310.

Figure 14:
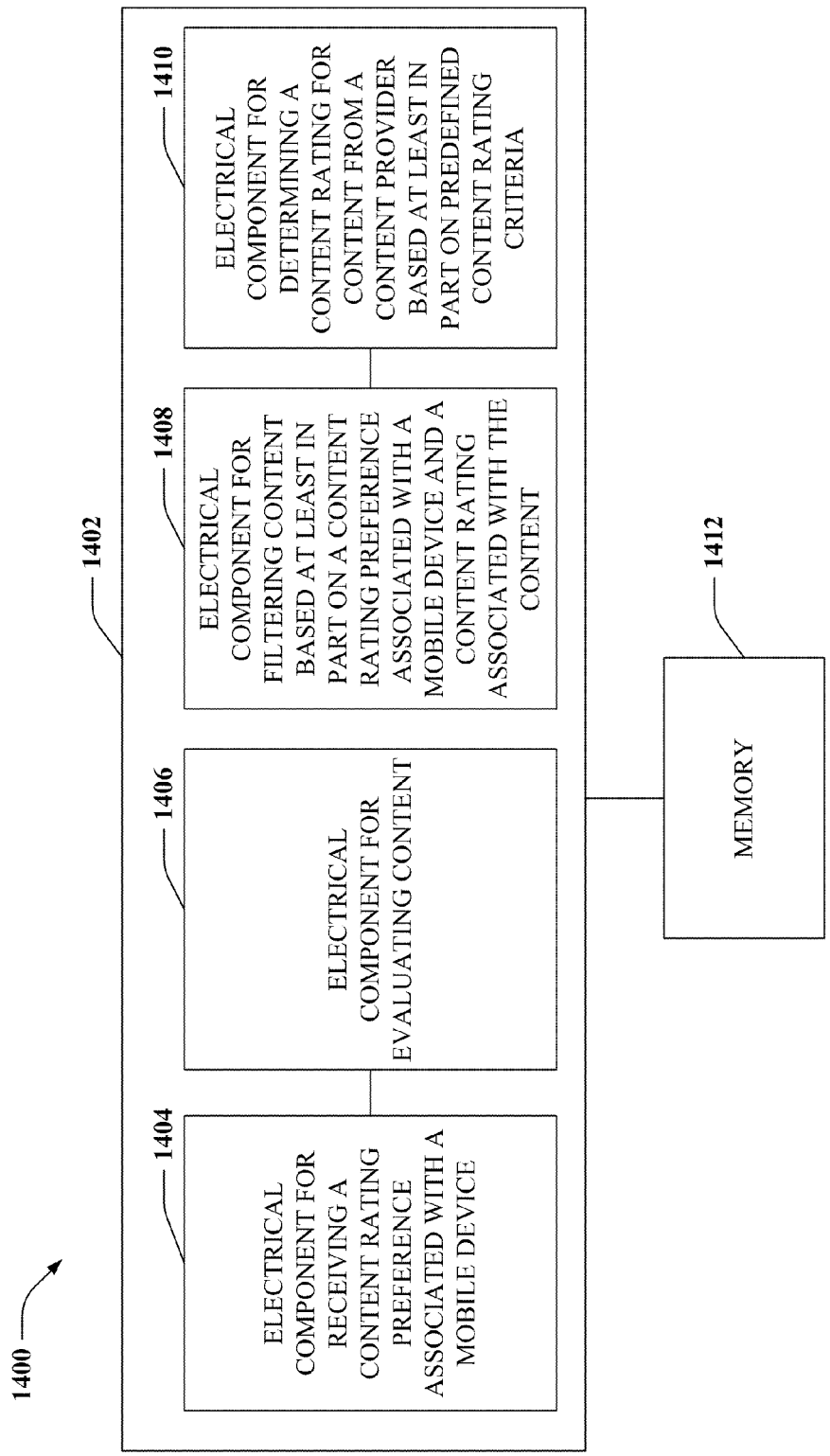
FIG. 14 is an illustration of another example system that can facilitate communication associated with a mobile device in a wireless communication environment.

Turning to FIG. 14, illustrated is a system 1400 that can facilitate communication associated with a mobile device in a wireless communication environment. For example, system 1400 can reside at least partially within a core network 202 that can be associated (e.g., wirelessly connected) with a mobile device (e.g., 116) via a base station 102. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction.

In one aspect, logical grouping 1402 can include an electrical component for receiving a content rating preference associated with a mobile device (e.g., 116) 1404. In one aspect, the electrical component for receiving a content rating preference associated with a mobile device 1404 can receive content rating preference associated with a mobile device 116 via the mobile device 116, a web site associated with the core network 202, a phone call to a representative (e.g., live representative, automated representative) associated with the core network 202, or another form of communication with the core network 202.

Also, logical grouping 1402 can comprise an electrical component for evaluating content 1406. The electrical component for evaluating content 1406 can evaluate content received in a message from a content provider 204 to a mobile device(s) 116 to facilitate determining whether the content is to be sent to the mobile device(s) 116 or is to be filtered out. The electrical component for evaluating content 1406 can evaluate a content rating associated with the content, where the content rating can be based at least in part on predefined content rating criteria, and a content rating preference(s) associated with the mobile device(s) 116 to facilitate evaluating the content.

Further, logical grouping 1402 can comprise an electrical component for filtering content based at least in part on the content rating preference of the mobile device(s) 116 and the content rating associated with the content from a content provider (e.g., 204) 1408. In one aspect, the electrical component 1408 can filter content being provided to a mobile device(s) 116 by a content provider 204 based at least in part on a content rating associated with the provided content and a content rating preference associated with the mobile device(s) 116. Content with a content rating that does not meet the content rating threshold, as specified by the content rating preference, can be filtered out and can be discarded or stored in a secure content folder, as desired. The secure content folder can be accessed by a certain user (e.g., parent) by providing a valid security code for the secure content folder. Content that meets the content rating threshold, as specified by the content rating preference, can be sent to the mobile device(s) 116.

Logical grouping 1402 also can include an electrical component for determining a content rating for content based at least in part on predefined content rating criteria 1410. In one aspect, the electrical component 1410 can parse the content (e.g., parse text and/or images in the content), and can analyze and evaluate received content being provided to a mobile device 116 to determine a content rating that can be associated with the content based at least in part on predefined content rating criteria. The determined content rating can be utilized to facilitate filtering the content being sent to a mobile device(s) 116. Additionally, system 1400 can include a memory 1412 that retains instructions for executing functions associated with electrical components 1404, 1406, 1408, and 1410. While shown as being external to memory 1412, it is to be understood that one or more of electrical components 1404, 1406, 1408, and 1410 can exist within memory 1412.

Figure 15:
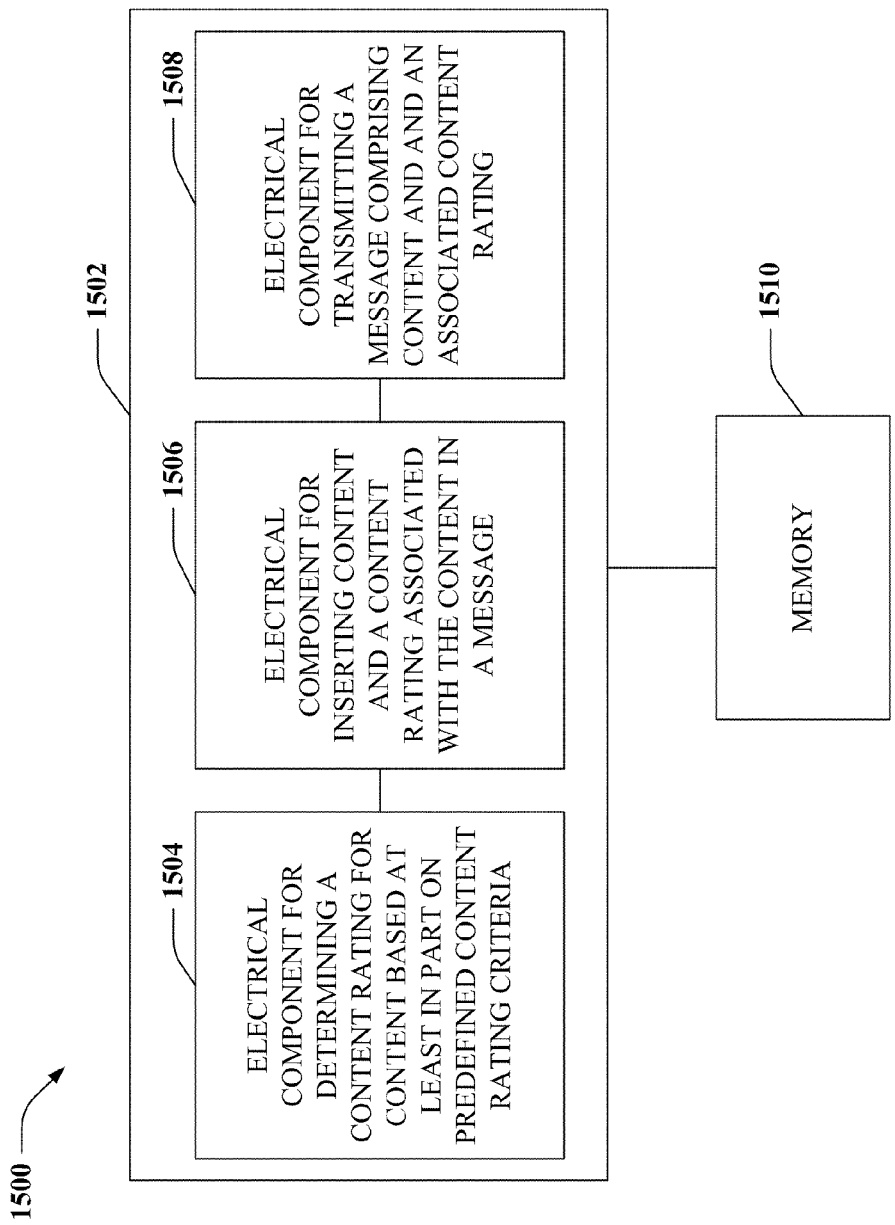
FIG. 15 is an illustration of yet another example system that can facilitate communication associated with a mobile device in a wireless communication environment.

Referring to FIG. 15, illustrated is a system 1500 that can facilitate communication associated with a mobile device in a wireless communication environment. For example, system 1500 can reside at least partially within a content provider 204 that can be associated (e.g., via wired connection, via wireless connection) with a core network 204 connected with a mobile device(s) (e.g., 116) via a base station 102. It is to be appreciated that system 1500 is represented as including functional blocks, which can be functional blocks that represent functions implemented by a processor, software, or combination thereof (e.g., firmware). System 1500 includes a logical grouping 1502 of electrical components that can act in conjunction.

In one aspect, logical grouping 1502 can include an electrical component for determining a content rating for content 1504. In one aspect, the electrical component for determining a content rating for content 1504 can determine the content rating of the content based at least in part on predefined content rating criteria.

Further, logical grouping 1502 can comprise an electrical component for inserting content and a content rating associated with the content in a message 1506. In one aspect, the electrical component for inserting content and a content rating associated with the content in a message 1506 can insert the content in the body of the message, and can insert the content rating in a subparameter or header of the message or can insert in the content rating in the body of the message, where a keyword(s) in the body of the message can facilitate indicating where the content rating is located in the body of the message.

Logical grouping 1502 also can include an electrical component for transmitting a message comprising the content and associated content rating 1508. In one aspect, the electrical component for transmitting a message comprising the content and associated content rating 1508 can transmit the message comprising content and associated content rating to the core network 202 to facilitate sending the content to a desired mobile device(s) 116 connected to the core network 202, while also facilitating filtering of undesired content based at least in part on the content rating of the content and the content rating preference associated with the mobile device(s) 116. Additionally, system 1500 can include a memory 1510 that retains instructions for executing functions associated with electrical components 1504, 1506, and 1508. While shown as being external to memory 1510, it is to be understood that one or more of electrical components 1504, 1506, and 1508 can exist within memory 1510.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates communication associated with a mobile device, comprising:
setting a content rating preference associated with the mobile device;
receiving at least one message comprising at least one piece of content from at least one content provider, the at least one message comprising at least one content rating associated with the at least one piece of content;
restricting access to the at least one piece of content based on at least in part on the content rating preference and the at least one content rating;
storing the restricted at least one piece of content in a secure content folder on the mobile device; and
permitting a user of the mobile device to access the restricted at least one piece of content in the secure content folder in response to a security code from the user that overrides the content rating preference.

2. The method of claim 1, wherein the at least one content rating is determined based at least in part on predefined content rating criteria.

3. The method of claim 2, wherein the predefined content rating criteria relates to at least one of nature of language in content, nature of audio content, nature of visual content, or any combination thereof, wherein content that is more adult-oriented is given a higher content rating than content that is less adult-oriented based at least in part on the predefined content rating criteria.

4. The method of claim 1, further comprising:
accessing a content rating preference parameter,
wherein the setting sets the content rating preference based at least in part on predefined content rating criteria.

5. The method of claim 1, further comprising:
wherein the permitting permits the access to the secure content folder if the received security code is valid; and
receiving at least one other piece of content from the secure content folder, the at least one other piece of content is filtered out based at least in part on the content rating preference and at least one other content rating associated with the at least one other piece of content, and stored in the secure content folder, the at least one other piece of content and the at least one other content rating contained in at least one other message.

6. The method of claim 1, further comprising:
receiving the at least one message comprising the at least one piece of content and the at least one content rating from the at least one content provider via a core network.

7. The method of claim 6, wherein restricting the at least one piece of content further comprises:
evaluating the at least one piece of content; and
filtering out the at least one piece of content if the at least one content rating has a value that is higher than a value of the content rating preference.

8. The method of claim 1, further comprising:
transmitting a message, comprising the content rating preference and a command related to setting the content rating preference associated with the mobile device, to a core network, the message is a modified short message service (SMS) message and the content rating preference is contained in at least one of an additional short message service (SMS) rating preference parameter, an additional enhanced messaging service (EMS) rating preference header, or any combination thereof, wherein the content rating preference is a value ranging from highest-level content filtering to no content filtering.

9. The method of claim 1, further comprising:
transmitting a message, comprising a query and a command that are related to the content rating preference, to a core network, the message is a modified short message service (SMS) message and the query is contained in at least one of an additional short message service (SMS) query parameter, an additional enhanced messaging service (EMS) query header, or any combination thereof;
querying the core network regarding a current value of the content rating preference based at least in part on the query; and
receiving the current value of the content rating preference in response to the query.

10. The method of claim 1, wherein the at least one message is received from the at least one content provider via a core network, the at least one message being a modified short message service (SMS) message comprising the at least one content rating that is contained in at least one of an additional short message service (SMS) rating parameter, an additional enhanced messaging service (EMS) rating header, a rating field in a body of the at least one message, or any combination thereof, wherein the rating field is identified by one or more keywords.

11. The method of claim 1, further comprising:
receiving at least one other message comprising at least one piece of unrated content from at least one other content provider;
evaluating the at least on piece of unrated content;
determining a content rating of the at least one piece of unrated content; and
at least one of:
filtering out the at least one piece of unrated content if the determined content rating has a value that is higher than a value of the content rating preference, or
presenting the at least one piece of unrated content if the determined content rating has a value that is at or below the value of the content rating preference, or
any combination thereof.

12. The method of claim 1, further comprising:
receiving at least one other message comprising at least one piece of unrated content from at least one other content provider;
reviewing at least one contact list associated with the mobile device; and
at least one of:
filtering out the at least one piece of unrated content if the at least one other content provider is not contained in the at least one contact list, or
presenting the at least one piece of unrated content if the at least one other content provider is contained in the at least one contact list, or
any combination thereof.

13. A wireless communications apparatus, comprising:
a memory that retains instructions for setting a content rating preference associated with a mobile device, receiving at least one message comprising at least one piece of content from at least one content provider, the at least one message comprising at least one content rating associated with the at least one piece of content, restricting access to the at least one piece of content based on at least in part on the content rating preference and the at least one content rating, storing the restricted at least one piece of content in a secure content folder on the mobile device, and permitting a user of the mobile device to access the restricted at least one piece of content in the secure content folder in response to a security code from the user that overrides the content rating preference; and a processor, coupled to the memory, configured to execute the instructions retained in the memory.

14. The wireless communications apparatus of claim 13, wherein the at least one content rating is determined based at least in part on predefined content rating criteria, wherein the predefined content rating criteria relates to at least one of nature of language in content, nature of audio content, nature of visual content, or any combination thereof, and wherein content that is more adult-oriented is given a higher content rating than content that is less adult-oriented based at least in part on the predefined content rating criteria.

15. The wireless communications apparatus of claim 13, wherein the memory retains instructions for:
accessing a content rating preference parameter,
wherein the setting sets the content rating preference based at least in part on predefined content rating criteria.

16. The wireless communications apparatus of claim 13, wherein the permitting permits the access to the secure content folder if the received security code is valid, wherein the memory further retains instructions for:
receiving at least one other piece of content from the secure content folder, the at least one other piece of content is filtered out based at least in part on the content rating preference and at least one other content rating associated with the at least one other piece of content, and stored in the secure content folder, the at least one other piece of content and the at least one other content rating contained in at least one other message.

17. The wireless communications apparatus of claim 13, wherein the memory further retains instructions for:
receiving the at least one message comprising the at least one piece of content and the at least one content rating from the at least one content provider via a core network.

18. A wireless communications apparatus that facilitates communication associated with a mobile device, comprising:
means for setting a content rating preference associated with the mobile device;
means for receiving at least one message comprising at least one piece of content from at least one content provider, the at least one message comprising at least one content rating associated with the at least one piece of content;
means for restricting access to the at least one piece of content based on at least in part on the content rating preference and the at least one content rating;
means for storing the restricted at least one piece of content in a secure content folder on the mobile device; and
means for permitting a user of the mobile device to access the restricted at least one piece of content in the secure content folder in response to a security code from the user that overrides the content rating preference.

19. The wireless communications apparatus of claim 18, wherein the at least one content rating is determined based at least in part on predefined content rating criteria, wherein the predefined content rating criteria relates to at least one of nature of language in content, nature of audio content, nature of visual content, or any combination thereof, and wherein content that is more adult-oriented is given a higher content rating than content that is less adult-oriented based at least in part on the predefined content rating criteria.

20. The wireless communications apparatus of claim 18, further comprising:
means for accessing a content rating preference parameter; and
means for setting the content rating preference based at least in part on predefined content rating criteria.

21. A non-transitory computer-readable medium comprising:
code for causing at least one computer to set a content rating preference associated with a mobile device; and
code for causing the at least one computer to receive at least one message comprising at least one piece of content from at least one content provider, the at least one message comprising at least one content rating associated with the at least one piece of content;
code for causing the at least one computer to restrict access to the at least one piece of content based on at least in part on the content rating preference and the at least one content rating;
code for causing the at least one computer to store the restricted at least one piece of content in a secure content folder on the mobile device; and
code for causing the at least one computer to permit a user of the mobile device to access the restricted at least one piece of content in the secure content folder in response to a security code from the user that overrides the content rating preference.

22. The non-transitory computer-readable medium of claim 21, further comprising:
code for causing the at least one computer to access a content rating preference parameter; and
code for causing the at least one computer to set the content rating preference based at least in part on predefined content rating criteria.

23. The non-transitory computer-readable medium of claim 21,
wherein the code for causing the at least one computer to permit permits the access to the secure content folder if the received security code is valid, further comprising:
code for causing the at least one computer to receive at least one other piece of content from the secure content folder, the at least one other piece of content is filtered out based at least in part on the content rating preference and at least one other content rating associated with the at least one other piece of content, and stored in the secure content folder, the at least one other piece of content and the at least one other content rating contained in at least one other message.

24. The non-transitory computer-readable medium of claim 21, further comprising:
code for causing the at least one computer to evaluate the at least one piece of content; and
code for causing the at least one computer to filter out the at least one piece of content if the at least one content rating has a value that is higher than a value of the content rating preference.

25. The non-transitory computer-readable medium of claim 21, wherein the at least one content rating is determined based at least in part on predefined content rating criteria, wherein the predefined content rating criteria further relates to at least one of nature of language in content, nature of audio content, nature of visual content, or any combination thereof, and wherein content that is more adult-oriented is given a higher content rating than content that is less adult-oriented based at least in part on the predefined content rating criteria.

26. A wireless communications apparatus, comprising:
a processor configured to:
set a content rating preference associated with a mobile device;
receive at least one message comprising at least one piece of content from at least one content provider, the at least one message comprising at least one content rating associated with the at least one piece of content;

restrict access to the at least one piece of content based on at least in part on the content rating preference and the at least one content rating;

store the restricted at least one piece of content in a secure content folder on the mobile device; and permit a user of the mobile device to access the restricted at least one piece of content in the secure content folder in response to a security code from the user that overrides the content rating preference.

27. The wireless communications apparatus of claim 26, wherein the processor is further configured to:

access a content rating preference parameter, wherein the processor is configured to set the content rating preference based at least in part on predefined content rating criteria.

28. A method that facilitates communication associated with a mobile device, comprising:

evaluating at least one piece of content received in at least one message being sent to at least one mobile device from at least one content provider, the at least one message comprising at least one content rating associated with the at least one piece of content; and restricting access to the at least one piece of content based at least in part on the at least one content rating and at least one content rating preference associated with the at least one mobile device;

storing the restricted at least one piece of content in at least one secure content folder on the at least one mobile device; and permitting at least one user of the at least one mobile device to access the restricted at least one piece of content in the at least one secure content folder in response to at least one security code from the at least one user that overrides the at least one content rating preference.

29. The method of claim 28, further comprising:

receiving the at least one security code in relation to the at least one content rating preference associated with the at least one mobile device;

evaluating the at least one security code to facilitate determining if the at least one security code is valid;

receiving a message comprising the at least one content rating preference and a command related to setting the at least one content rating preference from the at least one mobile device, the message is a modified short message service (SMS) message and the at least one content rating preference is contained in at least one of an additional short message service (SMS) rating preference parameter, an additional enhanced messaging service (EMS) rating preference header, or any combination thereof;

setting at least one content rating preference parameter associated with the at least one mobile device to the at least one content rating preference, if the at least one security code is determined valid; and storing the at least one content rating preference if the at least one security code is determined valid.

30. The method of claim 29, wherein the at least one security code further is received via at least one of the at least one mobile device in communication with a core network, a web site associated with the core network, a voice call to a representative associated with the core network, or any combination thereof.

31. The method of claim 28, further comprising:

receiving the at least one security code in relation to the at least one secure content folder associated with the at least one mobile device;

evaluating the at least one security code to facilitate determining if the at least one security code is valid;

accessing the at least one secure content folder if the at least one security code is valid;

retrieving at least one piece of restricted content; and providing the at least one piece of restricted content to at least one of the at least one mobile device, or at least one other communication device associated with the at least one user, or any combination thereof.

32. The method of claim 28, wherein restricting the at least one piece of content further comprises:

filtering out the at least one piece of content if the at least one content rating has a value that is higher than a value of the at least one content rating preference.

33. The method of claim 28, further comprising:

receiving the at least one message from the at least one content provider, the at least one message being a modified short message service (SMS) message comprising the at least one content rating that is contained in at least one of an additional short message service (SMS) rating parameter, an additional enhanced messaging service (EMS) rating header, a rating field in a body of the at least one message, or any combination thereof, wherein the rating field is identified by one or more keywords.

34. The method of claim 28, further comprising:

receiving a message, comprising a query and a command that are related to the at least one content rating preference, from the at least one mobile device, the message being a modified short message service (SMS) message and the query being contained in at least one of an additional short message service (SMS) query parameter, an additional enhanced messaging service (EMS) query header, or any combination thereof;

retrieving a current value of the at least one content rating preference associated with the at least one mobile device based at least in part on the query; and transmitting another message, which contains the current value of the at least one content rating preference, to the at least one mobile device in response to the query.

35. The method of claim 28, further comprising:

receiving at least one other message comprising at least one piece of unrated content from at least one other content provider;

evaluating the at least on piece of unrated content;

determining a content rating of the at least one piece of unrated content based at least in part on predefined content rating criteria; and at least one of:

filtering out the at least one piece of unrated content if the determined content rating has a value that is higher than a value of the at least one content rating preference, or presenting the at least one piece of unrated content to the at least one mobile device if the determined content rating has a value that is at or below the value of the at least one content rating preference, or any combination thereof.

36. The method of claim 35, wherein the predefined content rating criteria relates to at least one of nature of language in content, nature of audio content, nature of visual content, or any combination thereof, wherein content that is more adult-oriented is given a higher content rating than content that is less adult-oriented based at least in part on the predefined content rating criteria.

37. The method of claim 28, further comprising:

receiving at least one other message comprising at least one piece of unrated content from at least one other content provider;

reviewing at least one contact list associated with the at least one mobile device; and at least one of:
  filtering out the at least one piece of unrated content if the at least one other content provider is not contained in the at least one contact list, or
  presenting the at least one piece of unrated content to the at least one mobile device if the at least one other content provider is contained in the at least one contact list, or
  any combination thereof.

38. A wireless communications apparatus, comprising:
  a memory that retains instructions for:
    evaluating at least one piece of content received in at least one message being sent to at least one mobile device from at least one content provider, the at least one message comprising at least one content rating associated with the at least one piece of content, the at least one content rating based at least in part on predefined content rating criteria,
    restricting access to the at least one piece of content based at least in part on the at least one content rating and at least one content rating preference associated with the at least one mobile device;
    storing the restricted at least one piece of content in at least one secure content folder on the at least one mobile device; and
    permitting at least one user of the at least one mobile device to access the restricted at least one piece of content in the at least one secure content folder in response to at least one security code from the at least one user that overrides the at least one content rating preference; and
  a processor, coupled to the memory, configured to execute the instructions retained in the memory.

39. The wireless communications apparatus of claim 38, wherein the memory further retains instructions related to:
  receiving the at least one security code in relation to the at least one content rating preference associated with the at least one mobile device;
  evaluating the at least one security code to facilitate determining if the at least one security code is valid;
  receiving the at least one content rating preference from the at least one mobile device;
  setting at least one content rating preference parameter associated with the at least one mobile device to the at least one content rating preference, if the at least one security code is determined valid; and
  storing the at least one content rating preference if the at least one security code is determined valid.

40. A wireless communications apparatus that facilitates communication associated with a mobile device, comprising:
  means for evaluating at least one piece of content received in at least one message being sent to at least one mobile device from at least one content provider, the at least one message comprising at least one content rating associated with the at least one piece of content, the at least one content rating based at least in part on predefined content rating criteria;
  means for restricting access to the at least one piece of content based at least in part on the at least one content rating and at least one content rating preference associated with the at least one mobile device;
  means for storing the restricted at least one piece of content in at least one secure content folder on the at least one mobile device; and
  means for permitting at least one user of the at least one mobile device to access the restricted at least one piece of content in the at least one secure content folder in response to at least one security code from the at least one user that overrides the at least one content rating preference.

41. The wireless communications apparatus of claim 40, further comprising:
  means for receiving the at least one security code in relation to the at least one content rating preference associated with the at least one mobile device;
  means for evaluating the at least one security code to facilitate determining if the at least one security code is valid;
  means for receiving the at least one content rating preference from the at least one mobile device;
  means for configuring at least one content rating preference parameter associated with the at least one mobile device to the at least one content rating preference, if the at least one security code is determined valid; and
  means for storing the at least one content rating preference if the at least one security code is determined valid.

42. A non-transitory computer-readable medium comprising:
  code for causing at least one computer to evaluate at least one piece of content received in at least one message being sent to at least one mobile device from at least one content provider, the at least one message comprising at least one content rating associated with the at least one piece of content, the at least one content rating based at least in part on predefined content rating criteria;
  code for causing the at least one computer to restrict access to the at least one piece of content based at least in part on the at least one content rating and at least one content rating preference associated with the at least one mobile device;
  code for causing the at least one computer to store the restricted at least one piece of content in at least one secure content folder on the at least one mobile device; and
  code for causing the at least one computer to permit at least one user of the at least one mobile device to access the restricted at least one piece of content in the at least one secure content folder in response to at least one security code from the at least one user that overrides the at least one content rating preference.

43. The non-transitory computer-readable medium of claim 42, further comprising:
  code for causing the at least one computer to receive the at least one security code in relation to the at least one content rating preference associated with the at least one mobile device;
  code for causing the at least one computer to evaluate the at least one security code to facilitate determining if the at least one security code is valid;
  code for causing the at least one computer to receive the at least one content rating preference from the at least one mobile device;
  code for causing the at least one computer to set at least one content rating preference parameter associated with the at least one mobile device to the at least one content rating preference, if the at least one security code is determined valid; and
  code for causing the at least one computer to store the at least one content rating preference if the at least one security code is determined valid.

44. The non-transitory computer-readable medium of claim 42, further comprising:

code for causing the at least one computer to receive the at least one security code in relation to the at least one secure content folder associated with the at least one mobile device;

code for causing the at least one computer to evaluate the at least one security code to facilitate determining if the at least one security code is valid;

code for causing the at least one computer to access the at least one secure content folder if the at least one security code is valid;

code for causing the at least one computer to retrieve at least one piece of restricted content; and code for causing the at least one computer to provide the at least one piece of restricted content to at least one of the at least one mobile device or at least one other communication device associated with the at least one user, or any combination thereof.

45. The non-transitory computer-readable medium of claim 42, wherein the predefined content rating criteria relates to at least one of nature of language in content, nature of audio content, nature of visual content, or any combination thereof, wherein content that is more adult-oriented is given a higher content rating than content that is less adult-oriented based at least in part on the predefined content rating criteria.

46. A wireless communications apparatus, comprising:
a processor configured to:
evaluate at least one piece of content received in at least one message being sent to at least one mobile device from at least one content provider, the at least one message comprising at least one content rating associated with the at least one piece of content, the at least one content rating based at least in part on predefined content rating criteria; and restrict access to the at least one piece of content based at least in part on the at least one content rating and at least one content rating preference associated with the at least one mobile device;

store the restricted at least one piece of content in at least one secure content folder on the at least one mobile device; and permit at least one user of the at least one mobile device to access the restricted at least one piece of content in the at least one secure content folder in response to at least one security code from the at least one user that overrides the at least one content rating preference.

47. The wireless communications apparatus of claim 46, wherein the predefined content rating criteria relates to at least one of nature of language in content, nature of audio content, nature of visual content, or any combination thereof, wherein content that is more adult-oriented is given a higher content rating than content that is less adult-oriented based at least in part on the predefined content rating criteria.

48. The method of claim 1, wherein the at least one message includes a given message that includes the at least one piece of content and the at least one content rating.

* * * * *